(12) United States Patent
Foutzitzis et al.

(10) Patent No.: US 10,186,075 B2
(45) Date of Patent: Jan. 22, 2019

(54) SYSTEM, METHOD, AND NON-TRANSITORY COMPUTER-READABLE STORAGE MEDIA FOR GENERATING 3-DIMENSIONAL VIDEO IMAGES

(71) Applicant: ADCOR MAGnet Systems, LLC, Baltimore, MD (US)

(72) Inventors: Evangelos Foutzitzis, Nottingham, MD (US); Javier Santoro, Victoria (CA)

(73) Assignee: ADCOR MAGnet Systems, LLC, Baltimore, MD (US)

( * ) Notice: Subject to any disclaimer, the term of this patent is extended or adjusted under 35 U.S.C. 154(b) by 0 days.

(21) Appl. No.: 15/826,483

(22) Filed: Nov. 29, 2017

(65) Prior Publication Data

US 2018/0150994 A1    May 31, 2018

Related U.S. Application Data

(60) Provisional application No. 62/497,745, filed on Nov. 30, 2016.

(51) Int. Cl.
*H04N 7/18* (2006.01)
*G01S 19/13* (2010.01)
*G01S 19/14* (2010.01)
*G06T 15/04* (2011.01)
*G06T 15/20* (2011.01)
(Continued)

(52) U.S. Cl.
CPC ............ *G06T 15/205* (2013.01); *G06T 15/04* (2013.01); *G06T 17/05* (2013.01); *G06T 17/20* (2013.01); *H04N 5/23238* (2013.01); *H04N 7/18* (2013.01); *G01S 19/13* (2013.01); *G01S 19/14* (2013.01); *G06T 2215/16* (2013.01)

(58) Field of Classification Search
CPC ...... H04N 5/23238; G06T 2207/10016; G06T 2207/30232; G06T 3/0018; G06T 3/005; G06T 3/0062; G03B 37/00
See application file for complete search history.

(56) References Cited

U.S. PATENT DOCUMENTS 7,221,866 B2    5/2007 Clemens
9,743,060 B1    8/2017 Matias et al.
(Continued)

OTHER PUBLICATIONS

International Search Report and Written Opinion (International Application No. PCT/US 17/63943; dated Mar. 1, 2018.

*Primary Examiner* — Haixia Du
(74) *Attorney, Agent, or Firm* — Howard & Howard Attorneys PLLC

(57) ABSTRACT

A computer system for displaying spherical video images is described. The computer system includes a user computing device including a display device and a processor coupled to the display device. The processor programmed to receive video image data from an imaging device. The video image data includes 2D circular video images. The processor determines the FOV dimensions associated with the imaging device as a function of the video image data and generates a 3D spherical wireframe object on the display device having a surface area determined as a function of the FOV dimensions associated with the imaging device. The processor maps the video image data onto the 3D spherical wireframe object and renders a 3D video image object on the display device including the video image data being displayed on the 3D spherical wireframe object.

14 Claims, 23 Drawing Sheets

(51) Int. Cl.
*G06T 17/05* (2011.01)
*G06T 17/20* (2006.01)
*H04N 5/232* (2006.01)

(56) References Cited

U.S. PATENT DOCUMENTS

| | | |
|---|---|---|
| 2008/0076556 A1 | 3/2008 | Icart |
| 2014/0152655 A1* | 6/2014 | Johnston ................ G06F 3/011 |
| | | 345/419 |
| 2015/0264340 A1 | 9/2015 | Seidl et al. |
| 2017/0323422 A1 | 11/2017 | Kim et al. |
| 2017/0339392 A1 | 11/2017 | Forutanpour et al. |

* cited by examiner

| Imaging Device ID | IP Address | FOV Dimensions | |
|---|---|---|---|
| | | Horizontal Angle of View, d | Vertical Angle of View, d |
| Image001 | 72.204.209 | 360° | 240° |
| Image030 | 172.16.254 | 270° | 180° |
| Image043 | 25.205.225 | 180° | 180° |

FIG. 13

| Client Device ID | IP Address | Device Type |
|---|---|---|
| Client010 | 84.214.209 | Smartphone |
| Client212 | 86..216.254 | Personal Computer |
| Client019 | 125.25.25 | Tablet |

FIG. 14

| FOV Dimensions | | 3D Object Dimensions | | |
|---|---|---|---|---|
| Horizontal Angle of View, d | Vertical Angle of View, d | Degree of Curvature, d | Segment Angle, d | No. of Segments |
| 360° | 240° | 360° | 240° | 320 |
| 270° | 180° | 270° | 180° | 180 |
| 180° | 180° | 180° | 180° | 180 |

FIG. 15

| Image Point | Geographic coordinate | Elevation |
|---|---|---|
| Pixel011 | 39°16'27.7"N 76°36'09.7"W | 12.20 |
| Pixel012 | 39°16'25.8"N 76°36'10.0"W | 02.02 |
| Pixel013 | 39°16'26.9"N 76°36'08.1"W | 120.03 |

FIG. 16

SYSTEM, METHOD, AND NON-TRANSITORY COMPUTER-READABLE STORAGE MEDIA FOR GENERATING 3-DIMENSIONAL VIDEO IMAGES

CROSS-REFERENCE TO RELATED APPLICATION

This application claims benefit of U.S. Provisional Application No. 62/497,745, filed Nov. 30, 2016, the disclosure of which is hereby incorporated by reference in its entirety for all purposes.

FIELD OF THE DISCLOSURE

The present invention relates to computer generated 3-dimensional video images, and more particularly, to systems, methods, and computer-readable storage media that generates geo-registered 3-dimensional video objects and textures the 3-dimensional video objects with 2-dimensional video images.

BACKGROUND

At least some known spherical camera systems are able to capture a field of view including 360 degrees around the camera. To be able to view the footage captured by a spherical camera, various options exist i.e. Virtual Reality headsets of appropriate software that allows the viewer to monitor a portion of the wider Field Of View video as an undistorted video stream.

Spherical video is projected to be a desired way of producing and distributing video in the upcoming years, not only due to the immersion it offers but also due to the interactivity between the user and the captured environment as now the viewer can now freely select what direction to monitor and is not confined to the "standard" camera narrow and fixed Field of View (FOV).

At least some known video camera manufacturers developed various types of spherical camera systems following a common approach on producing and distributing the spherical video. The fundamental technique used so far to produce spherical video is to combine footage from two or more narrower-FOV cameras assembled together (camera rigs) in such a manner so each one of them captures a small portion of the sphere. Then, through the use of appropriate software, the individual footages are "stitched" together to resemble the final sphere. This is the spherical video production stage. The second stage is to distribute the video. During this stage, various techniques are used to isolate a part of the total spherical video and present it as an undistorted narrow FOV video. As the final spherical video footage is the product of multiple video streams combined together into a single file it is natural that the end stream is a large file that becomes inconvenient to stream live over the internet or other conventional networks (i.e. cellular) due to bandwidth limitations.

At least some known systems generate spherical video that can be transferred only through wide-bandwidth media i.e. WiFi. This limits the end user to only stream the spherical video footage from their spherical camera to a nearby WiFi enabled smartphone or a tablet devices a.k.a. local wireless streaming. Alternatively, these multi-sensor cameras can record the video in an i.e. SD card and reproduce it later on. However, none of these known streaming techniques are live streaming over the internet as usually a live streaming camera with multiple sensors would require a bandwidth of 50 Mbits-200 Mbits. Furthermore, these cameras lack the IP protocol stack interfaces to be categorized as IP cameras since usually they are equipped with high bandwidth interfaces i.e. USB or WiFi. In other words, these cameras cannot be connected directly to an IP network unless external processing media are used i.e. video compression and conversion servers. This processes of course is far from an actual live internet streaming as spherical footage currently seen on the internet are pre-recorded files, none of which is live.

The present invention is aimed at one or more of the problems identified above.

SUMMARY OF THE INVENTION

In different embodiments of the present invention, systems, methods, and computer-readable storage media for generating and streaming real-time images from a spherical image data having a 360 degree field of view and displaying the images as non-distorted images from a selected viewpoint, is provided.

In one embodiment of the present invention, a computer system for displaying spherical video images is provided. The computer system includes a user computing device including a display device and a processor coupled to the display device. The processor programmed to receive video image data from an imaging device. The video image data includes 2-dimensional (2D) circular video images. The processor determines field-of-view (FOV) dimensions associated with the imaging device as a function of the video image data and generates a 3-dimensional (3D) spherical wireframe object on the display device having a surface area determined as a function of the FOV dimensions associated with the imaging device. The processor maps the video image data onto the 3D spherical wireframe object and renders a 3D video image object on the display device including the video image data being displayed on the 3D spherical wireframe object.

In another embodiment of the present invention, a system for displaying spherical video images is provided. The system includes an imaging device and a user computing device. The imaging device is configured to capture 2D circular video images and generate and transmit video image data including the 2D circular video images. The user computing device includes a display device and a processor coupled to the display device. The processor programmed to receive the video image data from the imaging device and determine FOV dimensions associated with the imaging device as a function of the video image data. The processor generates a 3D spherical wireframe object on the display device having a surface area determined as a function of the FOV dimensions associated with the imaging device. The processor maps the video image data onto the 3D spherical wireframe object and renders a 3D video image object on the display device including the video image data being displayed on the 3D spherical wireframe object.

In yet another embodiment, one or more non-transitory computer-readable storage media, having computer-executable instructions embodied thereon are provided. When executed by at least one processor, the computer-executable instructions cause the processor to receive video image data from an imaging device including 2D circular video images and determine field-of-view (FOV) dimensions associated with the imaging device as a function of the video image data. The processor generates a 3D spherical wireframe object on the display device having a surface area determined as a function of the FOV dimensions associated with the imaging device. The processor maps the video image data onto the 3D spherical wireframe object and renders a 3D video image object on a display device including the video image data being displayed on the 3D spherical wireframe object.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 13-16 are illustrations of exemplary data files generated by the system of FIG. 1, according to embodiments of the present invention;

Figure 1:
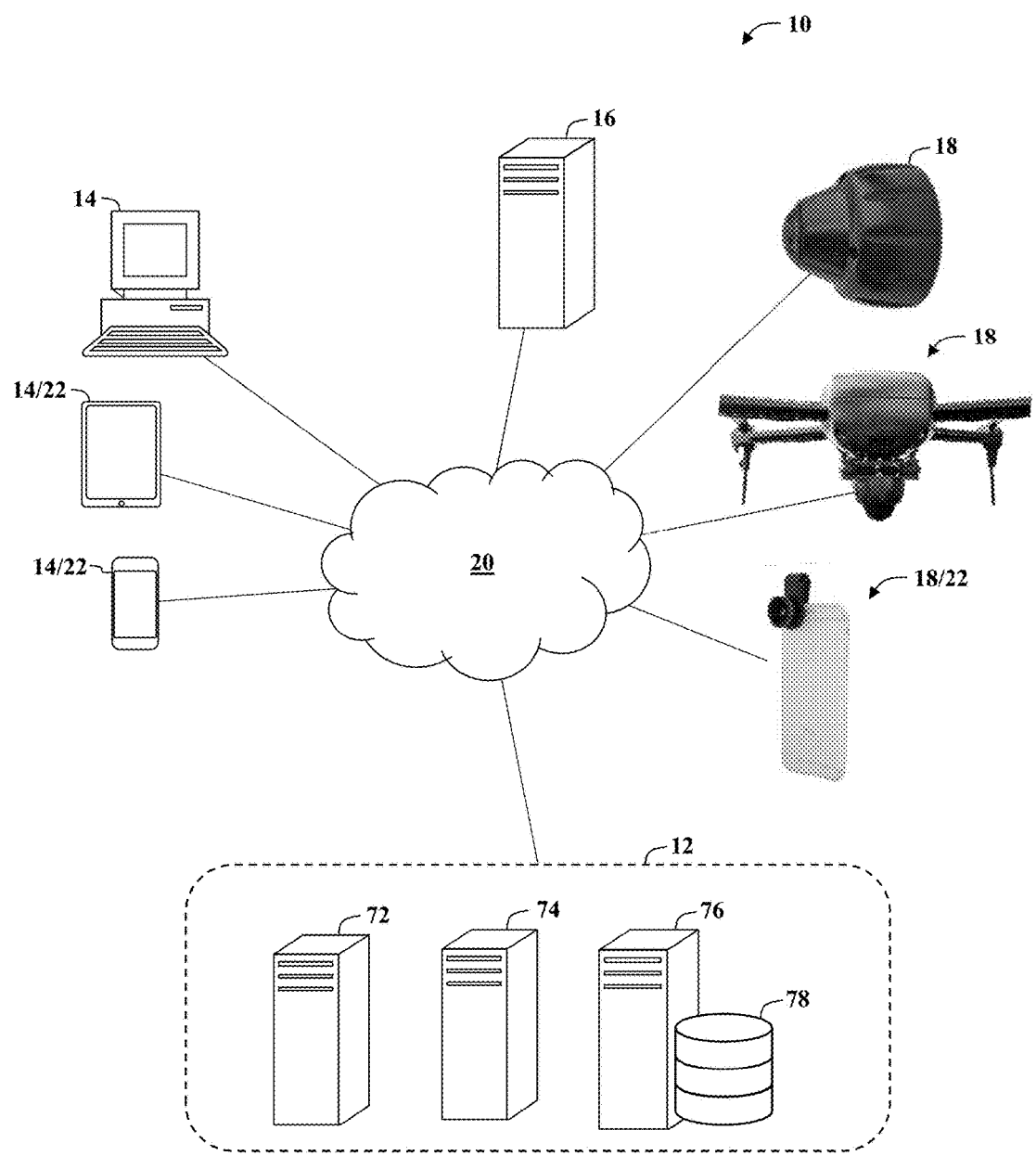
FIG. 1 is a schematic illustrating various aspects of a system, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

With reference to the FIGS. and in operation, the present invention provides a computer system 10, methods and computer product media for capturing a nearly 360 degree field of view image and transmitting it in real-time to a remote location where an undistorted 2-dimensional image may be displayed from any selected viewpoint. The system 10 implements a novel approach of producing and distributing spherical video content. The approach implements by the system utilizes a single sensor/single lens imaging device (also known as ubik 360™ and/or VR-Eye Camera™) to capture the circular video, e.g. a camera having a "fisheye" lens. The initial "fisheye" video footage produced by the camera fisheye lens is highly distorted and cannot be viewed without proper image rectification. The system 10 executes a highly optimized computing process to "dewarp" the camera footage in real time to produce an undistorted video. The highly optimized computing process (also known as ubik 360™ and/or VR-Eye™) improves video image production and distribution by producing the undistorted video without needing to stitch individual video streams. As a result, the bandwidth required to stream live spherical video content from the camera is equal to the bandwidth required to stream live video by a "standard" IP camera. Furthermore, the ubik 360/VR-Eye™ process developed to dewarp the video produced by the ubik 360/VR-Eye Camera™ follows a different technique than the REST fisheye video dewarping methods currently used by the spherical video camera vendors.

The ubik 360/VR-Eye spherical Camera™ streams live spherical video over the internet, cellular networks or other limited bandwidth type of networks as a standalone device (without the use of external hardware, software or firmware). The ubik 360/VR-Eye Camera™ may be used for live motoring of evens i.e. concerts, live news broadcasts, sports or any type of security and spherical surveillance applications i.e. smart cities, internet-of-things (JOT), drones, etc.

Known prior art systems use multiple cameras and require individual images from each camera to be "stitched" together to provide a 360 degree field of view. The present invention does not require stitching because it is able to provide the same field of view using a single camera. For example, at least some known prior art systems use two cameras each having a 180 degrees field to stitch two hemispheres together (at their circumferences). If four cameras are used that each has 90×90 degrees field of view, prior art systems are required to stitch 4 sectors together to achieve the whole sphere. For additional cameras, each sector is stitched together to achieve a final shape. These known techniques result in a significant amount of data that requires high-bandwidth network transmission and/or significant computer processing time.

Unlike prior art system, the present inventions utilizes a single image sensor, so there is no requirement for stitching. Rather, the present invention executes a computing process to "stretch" the fisheye video over a 3D wireframe object. Conceptually, the highly distorted original fisheye image that the camera outputs may be thought of as a disk shaped elastic membrane that can be pulled over a transparent sphere so as to cover the sphere. As a result, the membrane undergoes a "stretching" process, draping the image over the 3D transparent sphere. The image may then be viewed from any point within the transparent sphere and projected as an undistorted 2-D image.

In addition, the majority of known fisheye image dewarping techniques are based on applying common dewarping algorithms i.e. equirectangular, rectilinear, etc., over a portion of the fisheye image. These techniques will rectify the image in a portion of the sphere and then present it to the viewer as an undistorted image. By changing the portion of the fisheye image which is rectified each time (a.k.a. changing the FOV), the viewer has the feeling that monitors undistorted video in all 360 degrees.

The present invention implements an image rectification technique that is based on a vastly different methodology. For example, the system 10 is programmed to execute a ubik 360/VR-Eye™ process algorithm that includes the steps of first creating a 3D sphere object which is transparent, then "draping" the whole fisheye image over the transparent 3D sphere object. This draping technique is unique to the ubik 360/VR-Eye camera video dewarping process and is highly efficient as the whole spherical video is rectified at once and in real time (no post processing techniques are applied). An important outcome of the ubik 360/VR-Eye dewarping algorithm is that as the fisheye image is accurately draped over the 3D sphere object, every pixel of the spherical image can now be precisely referenced with regards to the sphere center. To that end, when the system 10 assigns a specific location (geographic coordinates) and orientation to the spherical object center, every pixel of the spherical video is subsequently assigned its own location and orientation. This outcome allows a real-time "georegistration" of every object that appears on the spherical video and can be used for accurate and real-time localization of assets appearing on the video stream.

The system 10 executes ubik 360/VR-Eye camera client software which is used for viewing the spherical video as an undistorted footage to apply this technique, to: a.) "georegister" in real time, every object appearing on the image; and b.) place the video sphere on its exact location and orientation on top of a digital mapping layer. By assigning an orientation vector to every pixel on the spherical image resulting from draping over a virtual transparent sphere, the system creates a series of orientation vectors, each starting at the sphere center and pointing outwards. The vectors that meet the ground (these are all the vectors that point below the horizon) will give the geographic coordinates at the point where they meet the ground (the system can measure that range and location from the algorithms running in the application based on geo-location equations). So for every object appearing inside the video sphere, the system can extract their geographic coordinates. The prerequisite is that these object are located below the sphere horizon i.e. below the sphere imaginary equator.

The present invention improves known video imaging systems by implementing the software used to dewarp the single-sensor ubik 360/VR-Eye camera spherical video stream to enable the system to dewarp any spherical video stream produced by a single sensor/single lens spherical camera on-the-fly without needing external software or hardware, and implement the dewarping process with client applications used to monitor the spherical video. To that extend, aspects of the present invention may be used with any imaging device that can produce spherical video using a single sensor/single lens such as, for example, a camera equipped smartphone where a spherical lens has been added to its existing camera sensor to increase its camera field of view to a spherical one.

In one embodiment, the system 10 is programmed to execute the ubik 360/VR-Eye algorithms to receive the fisheye video produced by the spherical lens modified smartphone and dewarp it in real time (on the fly). For example, the system 10 may include a spherical lens equipped smartphone streaming video over the cellular network or other types of wireless networks (WiFi), and a second smartphone (or tablet) that is receiving the video and dewarping the video images in real time through the ubik 360/VR-Eye algorithms running on it in a form of an application (app). In another embodiment, the system may be programmed to stream live spherical video received from a (spherical lens equipped) smartphone to other $3^{rd}$ party dewarping client applications i.e. YouTube 360, Facebook and similar dewarping spherical video clients. The system 10 may implement the ubik 360/VR-Eye proprietary algorithms to include the option of streaming live spherical video from smartphones i.e. the smartphone being the video transmitter as the first software application doing that at the time this patent application was filed. This example (single camera smartphone spherical video streaming) constitutes an example of an application of the ubik 360/VR-Eye technology and algorithms.

The system 10 may also include a ubik 360/VR-Eye Camera as an RTSP Video Server (i.e. IP Camera). The ubik 360/VR-Eye Camera is adapted a 360 (H)×240 (V) degrees FOV lens and produces 2 fisheye video streams: Hi definition and Standard Definition. However, other even wider FOV lenses, can be mounted to produce even wider FOV spherical video i.e. 360 (H)×280 (V) degrees FOV lens. The ubik 360/VR-Eye software Application receives the fisheye video stream by implementing an RTSP video client and connecting to the camera. The ubik 360VR-Eye application main UI window displays a 3D Map layer (with perspective and terrain altitude information). At the geo location of the remote ubik 360/VR-Eye Camera, the ubik 360/VR-Eye application draws a 3D "sphere" with the same FOV of the camera (i.e. 360 (H)×240 (V) degrees) and user defined radius. The ubik 360/VR-Eye application "projects" the received fisheye video stream onto the 3D Sphere. In the projection process the distortion produced by the fisheye lens on the camera is removed producing an undistorted live video stream that appears as a 3D sphere shown over the 3D Map at the location and orientation of the camera. The user's Point of View (i.e. the user's eye) can be located at the center of the 3D sphere allowing the user view a smaller "flat" region with the full camera FOV and also allowing for a "virtual" "pan" and "tilt" of his/her view.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Referring to FIG. 1, in the illustrated embodiment, the system 10 includes a server system 12 that is coupled in communication with one or more user computing devices 14, one or more $3^{rd}$ party mapping servers 16, and one or more imaging devices 18 via a communications network 20. The communications network 20 may be any suitable connection, including the Internet, file transfer protocol (FTP), an Intranet, LAN, a virtual private network (VPN), cellular networks, etc . . . , and may utilize any suitable or combination of technologies including, but not limited to wired and wireless connections, always on connections, connections made periodically, and connections made as needed.

The user computing device 14 may include any suitable device that enables a user to access and communicate with the system 10 including sending and/or receiving information to and from the system 10 and displaying information received from the system 10 to a user. For example, in one embodiment, the user computing device 14 may include, but is not limited to, a desktop computer, a laptop or notebook computer, a tablet computer, smartphone/tablet computer hybrid, a personal data assistant, a handheld mobile device including a cellular telephone, and the like. The user computing device 14, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Figure 5:
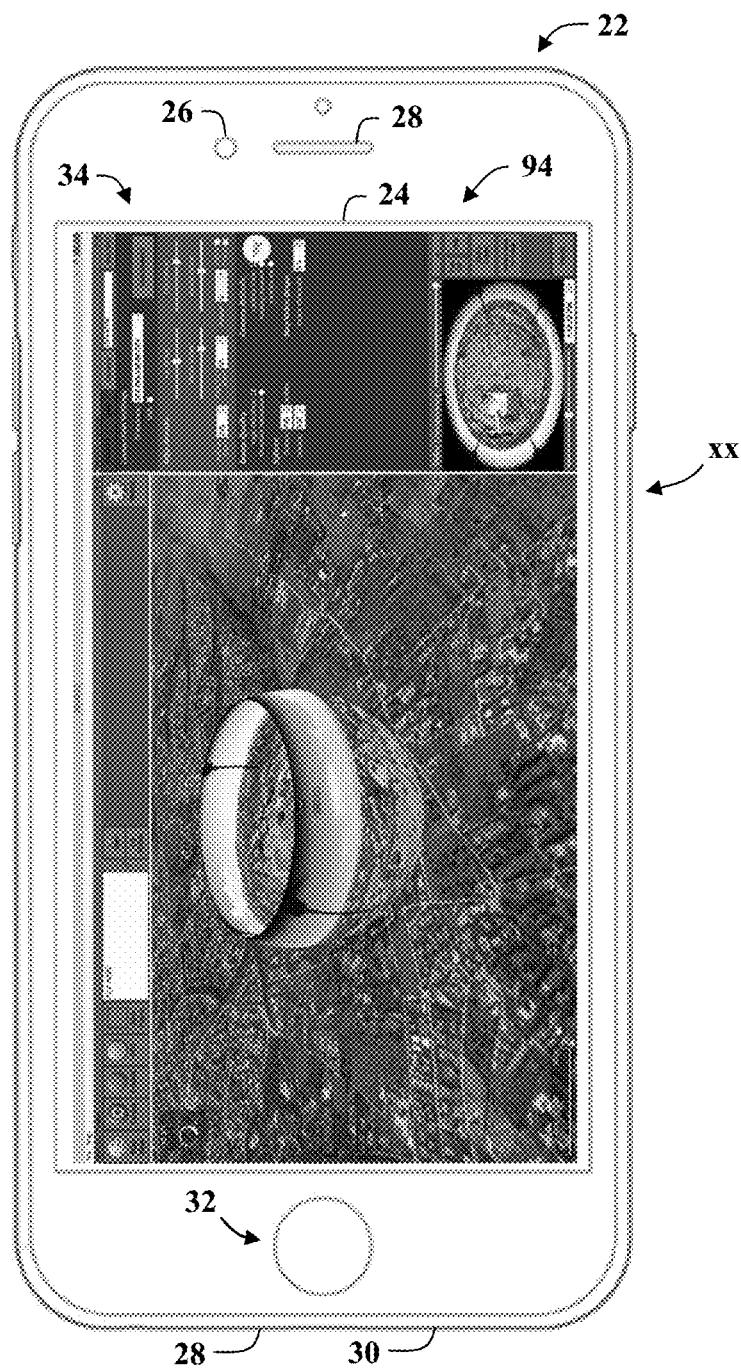
FIG. 5 is schematic illustrating an example user computing device that may be used with the system shown in FIG. 1, according to an embodiment of the present invention.

In one embodiment, the user computing device 14 includes a mobile computing device 22 (shown in FIG. 5) such as, for example, a smartphone such as an iPhone™. The mobile computing device 22 includes a processor coupled to a memory device, and a database for storing various programs and data for use in operating the mobile computing device 22. The mobile computing device 22 may also include a touchscreen display device 24, one or more video image cameras 26, one or more speakers 28, a microphone 30, at least one input button 32, and one or more sensors including, but not limited to, a touch ID fingerprint sensor coupled to an input button 32, a barometer, a three-axis gyro, an accelerometer, proximity sensor, and an ambient light sensor. In addition, the mobile computing device 22 may also include a Wi-Fi antenna, a cellular network antenna, a Bluetooth™ communications device, assisted GPS and GLONASS, a digital compass, and an iBeacon™ microlocation device.

In one embodiment, the mobile computing device 22 includes a web browser program stored in the memory device. The processor executes the web browser program to display web pages on the touchscreen display device 24 that includes information received from the server system 12 to enable a user to interact with and operate the server system 12. In addition, the mobile computing device 22 may be programmed to store and execute a computer program applications that display user interfaces (UI) 34 (shown in FIGS. 24-27) on the touchscreen display device 24 that allows the user to access the server system 12 to retrieve and store information within the server system 12 as well as interact with and operate the server system 12. In addition, in one embodiment, the system 10 may install one or more mobile computer application programs in the memory device of the mobile computing device 22. When initiated by the processor of the mobile computing device 22, the mobile computer application program causes the processor of the mobile computing device 22 to perform some or all of the functions of the server system 12.

Figure 3:
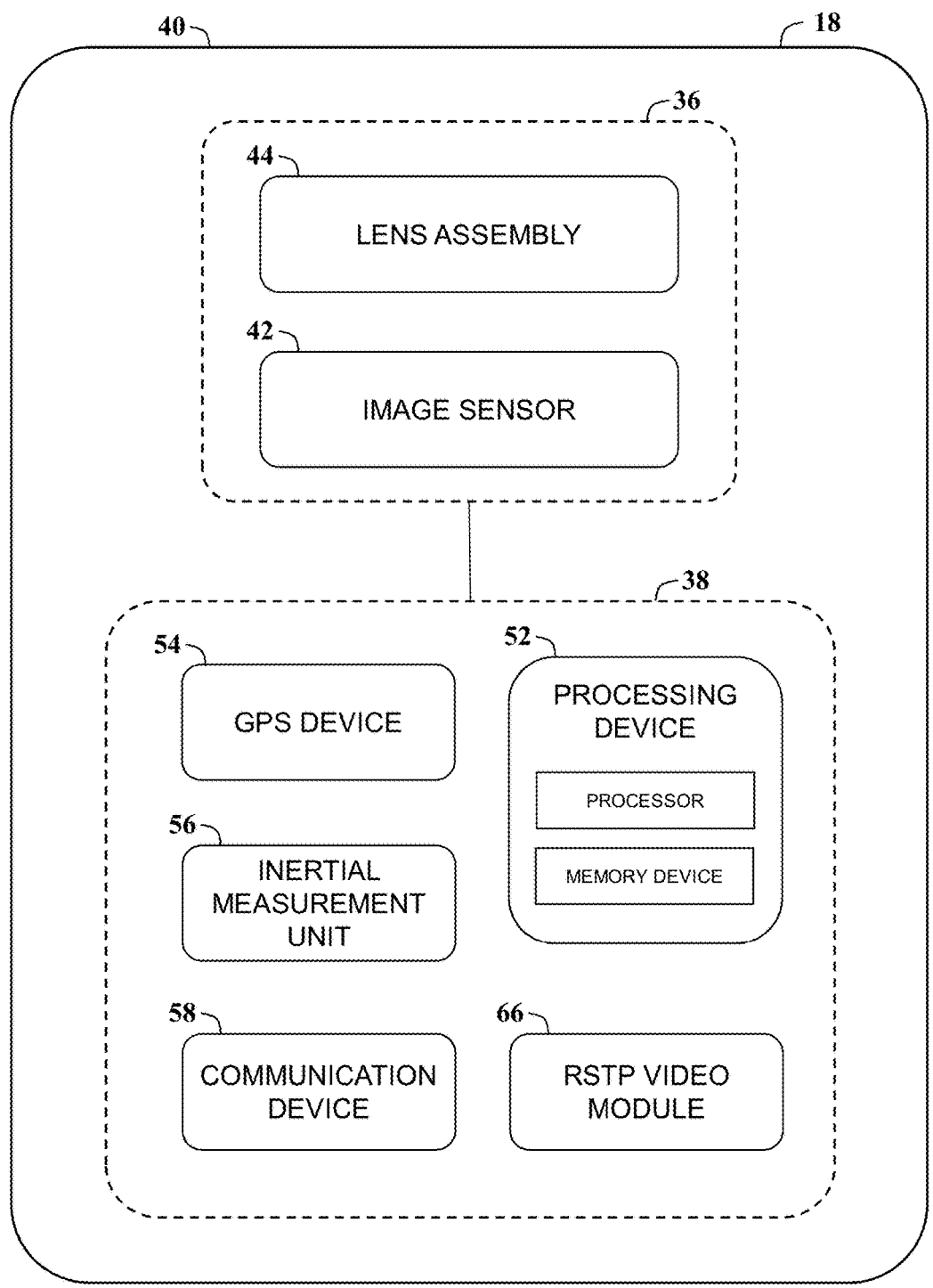
FIG. 3 is a schematic illustrating example components of an imaging device that may be used with the system shown in FIG. 1, according to an embodiment of the present invention.
Figure 6:
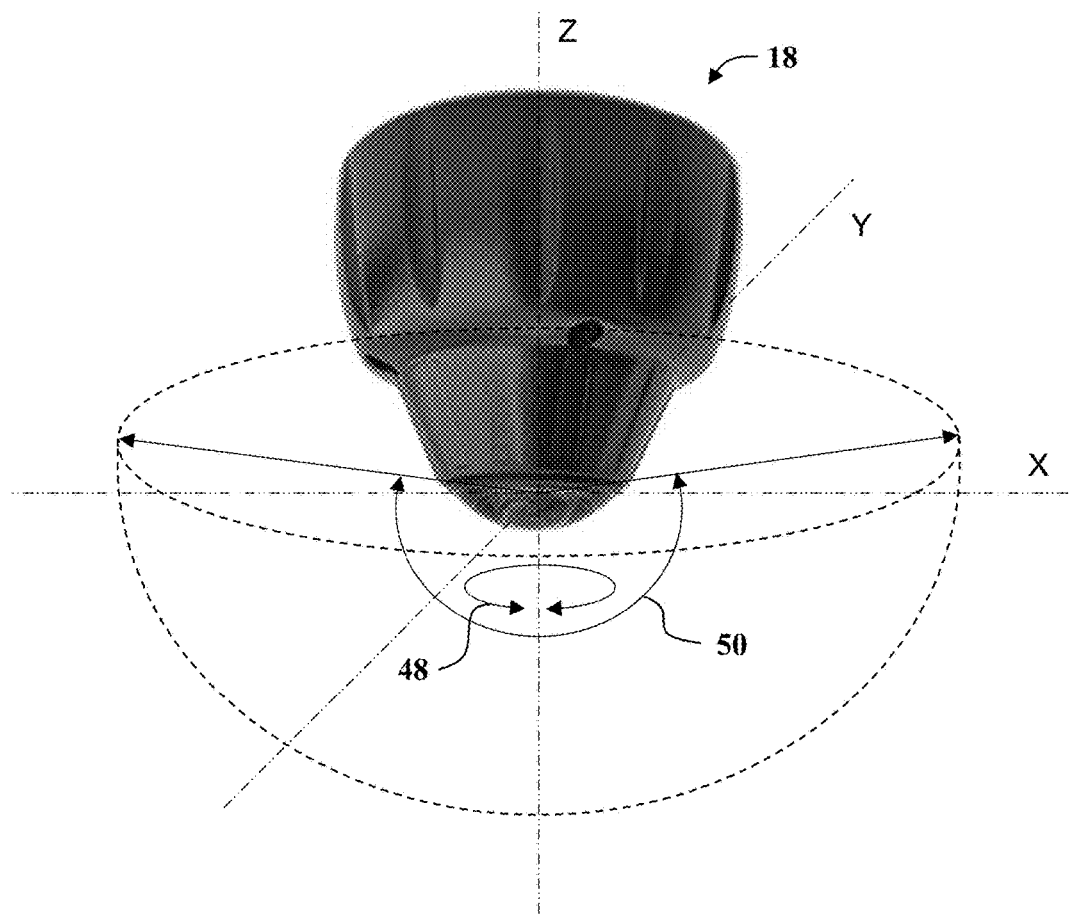
FIGS. 6 and 7 are perspective views of an imaging device that may be used with the system shown in FIG. 1, according to an embodiment of the present invention.
Figure 7:
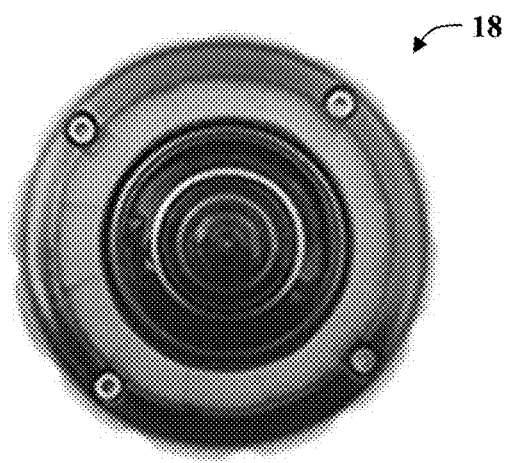
Figure 8:
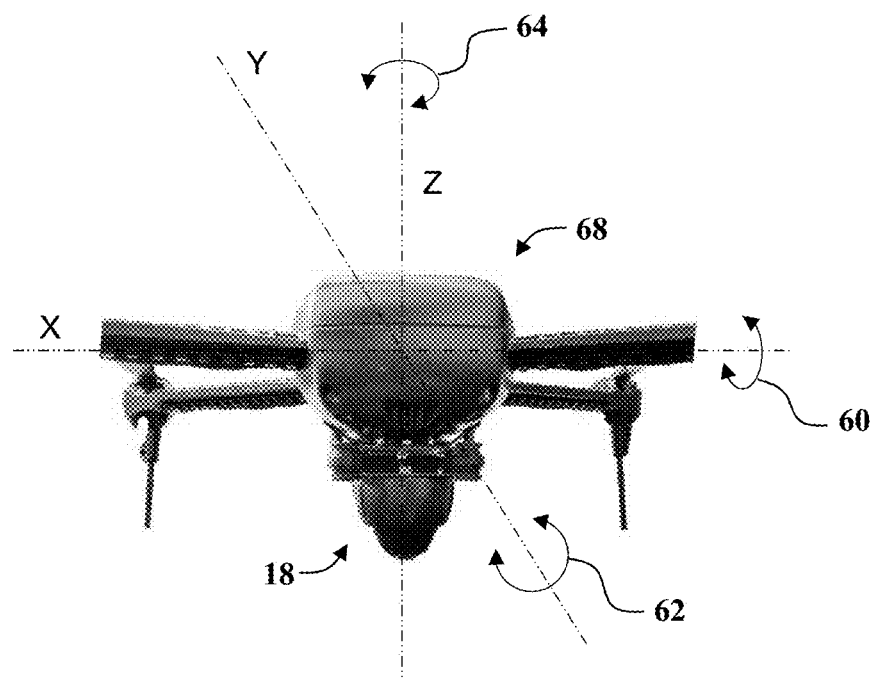
FIG. 8 is a perspective view of a mobile platform including the imaging device shown in FIGS. 6 and 7 that may be used with the system shown in FIG. 1, according to an embodiment of the present invention.
Figure 19:
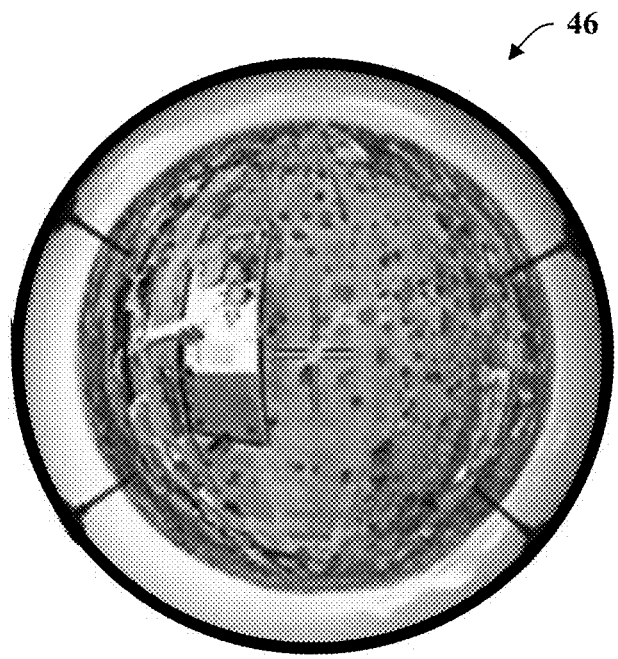
FIG. 19 is a graphic illustration of an exemplary 2D video image generated by the system of FIG. 1, according to embodiments of the present invention.
Figure 21:
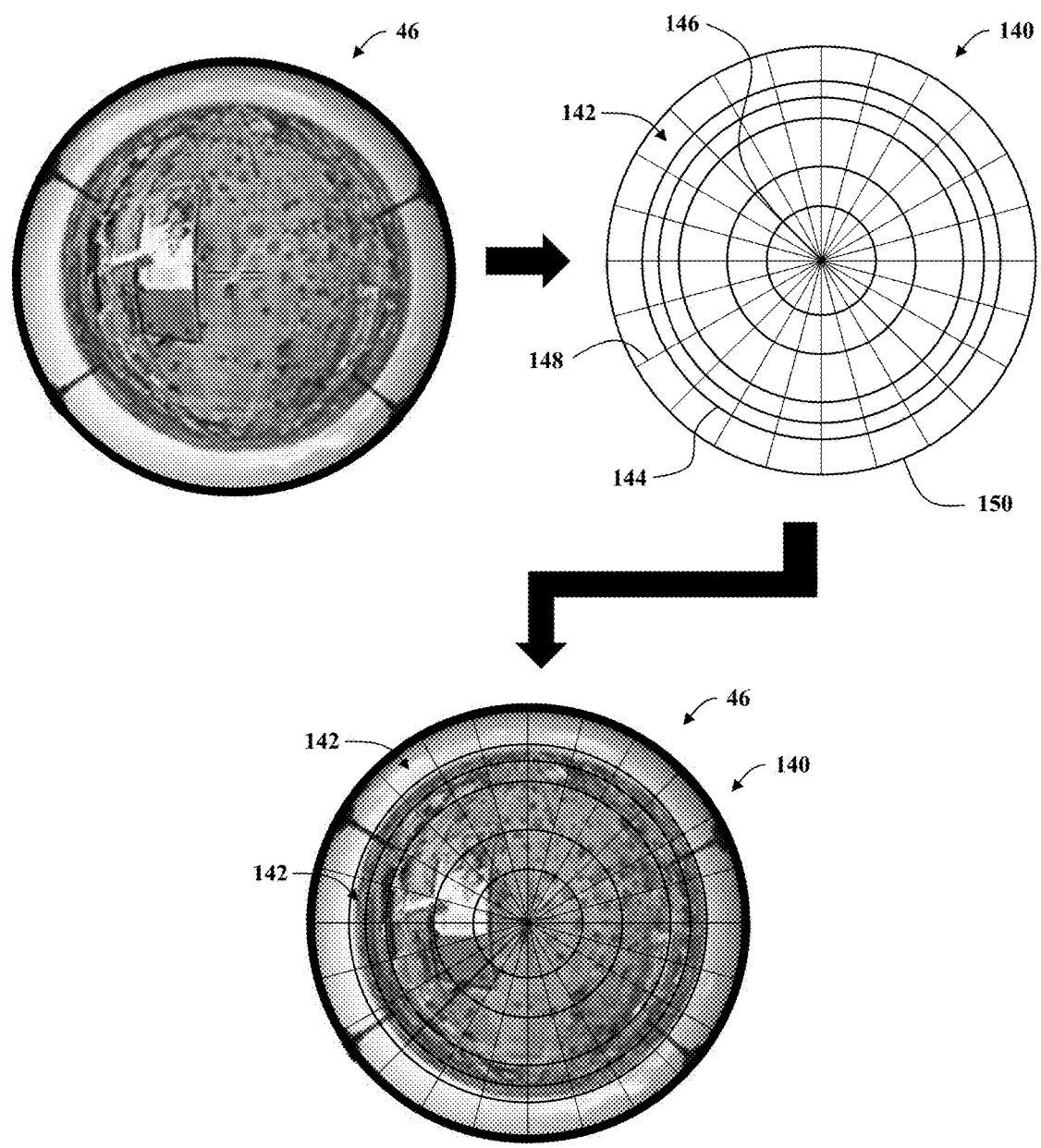
FIGS. 21 and 22 are sequences of graphic images illustrating the process of generating an exemplary 3D video image object by the system of FIG. 1, according to embodiments of the present invention.
Figure 22:
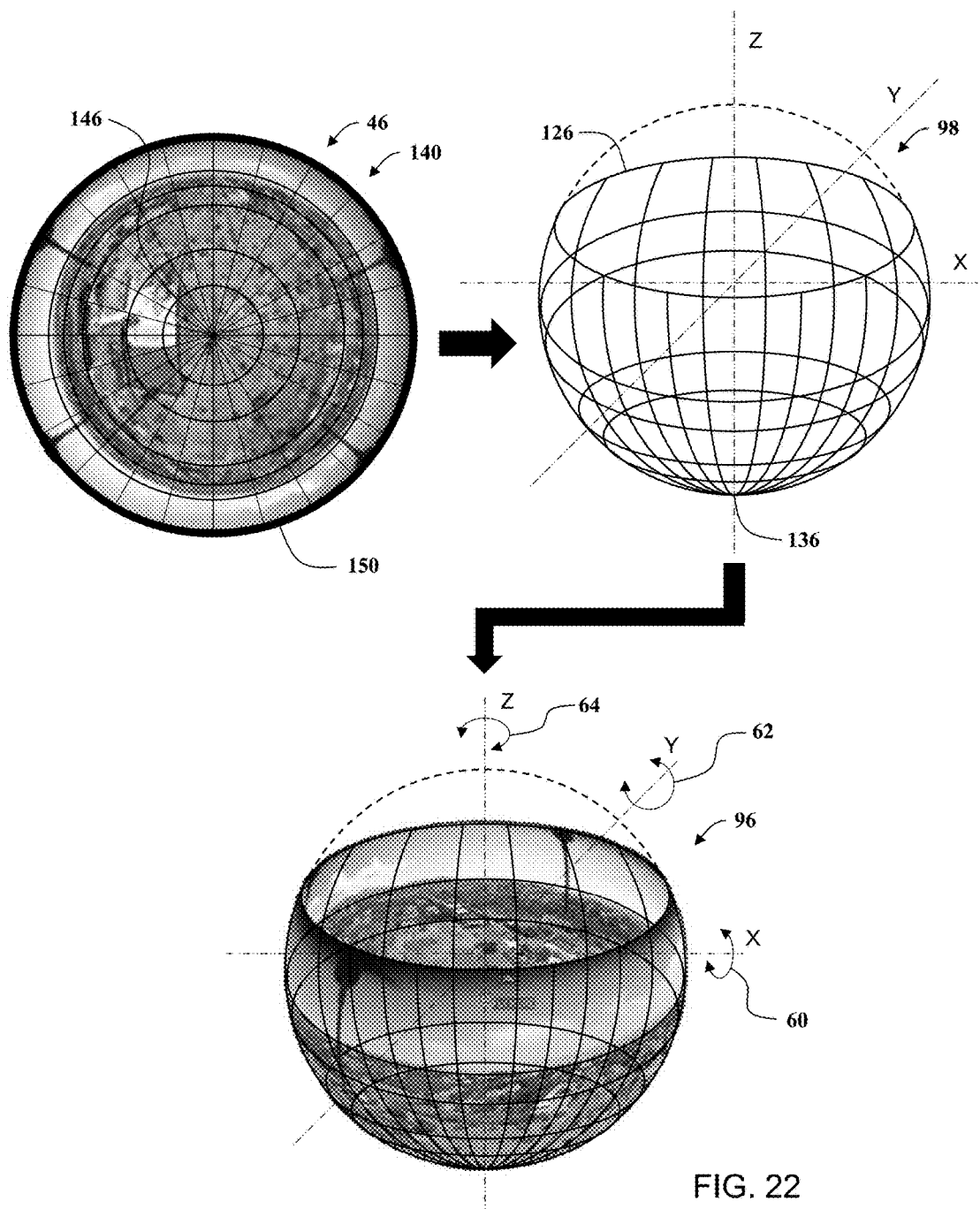

The imaging device 18 is configured to capture video images and generate and transmit video image data to the server system 12. With reference to FIG. 3, in the illustrated embodiment, the imaging device 18 includes a video imaging camera assembly 36 coupled to a camera control unit 38. In one embodiment, the video imaging camera assembly 36 and the camera control unit 38 may be mounted in a housing 40. The video imaging camera assembly 36 includes an image sensor 42 and a lens assembly 44. In the illustrated embodiment, lens assembly 44 includes an ultra-wide angle lens (e.g. a "Fisheye" lens) that is channel light rays to generate 2D circular video images 46 (as shown in FIGS. 19, 21, and 22). The image sensor 42 is configured to sense the light being channeled through the lens assembly 44 and generate 2D circular video images 46. The video imaging camera assembly 36 includes associated Field-of-View dimensions including, but not limited to, angle of view, focal length, and vertical, horizontal, and diagonal lengths. For example, as illustrated in FIG. 6, the imaging device 18 may include FOV dimensions defined with respect to a 3-dimensional coordinate plane, including a horizontal angle of view 48 measured about a Z-axis of the imaging device 18, and a vertical angle of view 50 measured with respect to a plane defined by the X-axis and the Y-axis The camera control unit 38 includes a processing device 52 that includes a processor that is coupled to the memory device. The processing device 52 is programmed to receive the 2D circular video images 46 being generated by the image sensor 42 and generate video image data that includes 2D circular video images including a series of consecutive 2D circular video images 46. The processing device 52 is configured to transmit the generated video image data to the server system 12 via the communications network 20. In the illustrated embodiment, the camera control unit 38 also includes a GPS device 54, an Inertial Measurement Unit (IMU) 56, and a communications device 58. The GPS device 54 is configured to generate position location data associated with imaging device 18. In one embodiment, the GPS device 54 is configured to generate position location data including geographic coordinate data and elevation data associated with the imaging device 18. The IMU 56 that is configured to generate data associated with the attitude of the imaging device 18. In one embodiment, the IMU 56 includes one or more accelerometers and/or gyroscopes that are configured to sense a pitch 60, roll 62, and yaw 64 (illustrated in FIG. 8) of the imaging device 18. In addition, in one embodiment, the IMU 56 may include a compass device configured to sense a bearing direction of the imaging device 18. The communications device 58 is configured to transmit and receive data via the communications network 20, and may include a cellular network antenna, a radio antenna, and/or any suitable device for broadcasting and receiving information via the communications network 20.

In the illustrated embodiment, the processing device 52 executes computer instructions to receive video images from the video imaging camera assembly 36, generate video image data from the received video images, and transmit the video image data to the server system 12 via the communications network 20 using the communications device 58. In addition, the processing device 52 is programmed to generate telemetry data associated with the imaging device 18 from attitude and bearing data from the IMU 56 and location and elevation data from the GPS device 54, and transmit the geo-location data to the server system 12 via the communications network 20 using the communications device 58. The telemetry data may include a geographic location, elevation, and orientation of the imaging device 18. In one embodiment, the processing device 52 is configured to generate and transmit a multiplexed data signal to the server system 12 that includes the video image data and the telemetry data. The camera control unit 38 may also include a Real Time Streaming Protocol (RTSP) video server module 66 that includes computer executable instructions for generating data signals using Real Time Streaming Protocol.

In one embodiment, the imaging device 18 is configured to be mounted to a mobile platform 68 (shown in FIG. 8) such as, for example, an aerial drone, an automobile, an airplane, a railcar, a freight truck, and/or any suitable mobile platform.

The imaging device 18 may also be implemented in a mobile computing device 22 such as a smartphone and/or tablet computer. For example, the mobile computing device 22 may include an ultra-wide fisheye lens for capturing 2D circular images. The mobile computing device 22 may include a computer program that causes the processing device of the mobile computing device 22 to function as the imaging device 18. For example, the mobile computer application may include computer instructions that cause the processing device of the mobile computing device 22 to operate the video image camera 26 to capture 2D circular video images using the ultra-wide fisheye lens and transmit the 2D circular video images to the server system 12 using the Wi-Fi antenna and/or cellular network antenna. In addition, the processing device of the mobile computing device 22 may also generate telemetry data associated with the mobile computing device 22 using information received from the barometer, the three-axis gyro, the accelerometer, the assisted GPS, and/or digital compass, and transmit the telemetry data to the server system 12. The processing device of the mobile computing device 22 may also be programmed to generate and transmit a multiplexed data signal to the server system 12 that includes the video image data and the telemetry data associated with the mobile computing device 22.

In the illustrated embodiment, the $3^{rd}$ party mapping server 16 are associated a service providing 3D topographical mapping information such as, for example, Google Maps™ MapQuest™, United States Geological Survey (USGS)™, and the like. The server system 12 is configured to communicate with the $3^{rd}$ party mapping server 16 to receive data and information associated with 3D topographical maps for use in generating 3D topographical maps 70 for display on one or more user computing devices 14 (shown in FIGS. 24, 25, 27). The data received from $3^{rd}$ party mapping server 16 may include, for example, object data and code sufficient to render computer generated images of 3D terrain including corresponding geographic coordinates.

In the illustrated embodiment, the server system 12 includes a website hosting server 72, 3D imaging server 74, a database server 76, and a database 78. The database server 76 includes a processor and a memory device that is connected to the database 78 to retrieve and store information contained in the database 78. The database 78 contains information on a variety of matters, such as, for example, web page templates associated with one or more websites, IP address information, 3D object information, user account information, imaging device information, mobile device identifies, mobile device application program interfaces (APIs), and/or any suitable information that enables the system 10 to function as described herein. In one embodiment, some or all of the information contained in the database 78 may also be stored in the memory device of a user computing device 14 and/or a mobile computing device 22.

In the illustrated embodiment, the database 78 includes IP address data files 80 (shown in FIGS. 13-14) that include in formation associate with various internet protocol (IP) addresses associated with computing devices on the Internet. In one embodiment, the IP address data files 80 include an imaging device IP address data file 82 and a client device IP address data file 84. The imaging device IP address data file 82 may include IP addresses associated with imaging devices 18 that are connected to the server system 12. In addition, the imaging device IP address data file 82 may include information associated with imaging devices 18 including, but not limited to, a unique imaging device ID, a corresponding IP address, and corresponding FOV dimensions including horizontal and vertical angles of view. The client device IP address data file 84 includes information associated with user computing devices 14 that are connected to the server system 12 including, but not limited to, a unique client device ID, a corresponding IP address, and information associated with the client device type data. Information associated with the client device type may include computer instructions for generating graphical user interfaces suitable for display on the corresponding user computing device 14 such as, for example, instructions for generating a mobile webpage suitable for display on a mobile computing device 22 or a webpage suitable for display on with the web browser program installed on a personal computer.

Referring to FIG. 15, the database 78 may also include a 3D object data file 86 that includes information and computer instructions for generating 3D computer graphic objects based on FOV dimensions associated with imaging devices 18. For example, the 3D object data file 86 may include a plurality of object records 88. Each object record includes FOV dimension data and corresponding 3D object dimension data. For example, the FOV dimension data may include FOV dimensions including horizontal angle of view and vertical angle of view information. The 3D object dimension data may include information associated with a degree of curvature, segment angle, and a number of 3D surface segments.

Referring to FIG. 16, in one embodiment, the database 78 may include a graphic image data file 90 that includes geographic data assigned to image points associated with 3D objects. For example, the graphic image data file 90 may include information associated with each of a plurality of image pixels including, but not limited, a unique pixel ID, and geographic coordinates including longitude and latitude coordinate data and elevation data.

The website hosting server 72 is configured to host a website that is accessible by a user via one or more user computing devices 14. The website hosting server 72 generates and transmits data and computer executable instructions to generate web pages 92 (shown in FIGS. 24-27) in response to requests received by the user via the user computing device 14. In the illustrated embodiment, the website hosting server 72 receives object data and computer instructions from the 3D imaging server 74 for use in generating the web pages 92. For example, in one embodiment, the website hosting server 72 is configured to generate and display a web page 92 including a graphical user interface including a video imaging display screen 94 displaying a 3D topographical map 70 including a 3D video image object 96 displaying video images received from an imaging device 18. The website hosting server 72 may receive information from the 3D imaging server 74 including data and instructions for generating the 3D topographical map 70 including a 3D video image object 96. The website hosting server 72 the generates computer instructions such as, for example, HTML code and object data, and transmits the instructions to the user computing device 14 to enable a web browser program installed on the user computing device 14 to generate and display the web pages 92.

Figure 25:
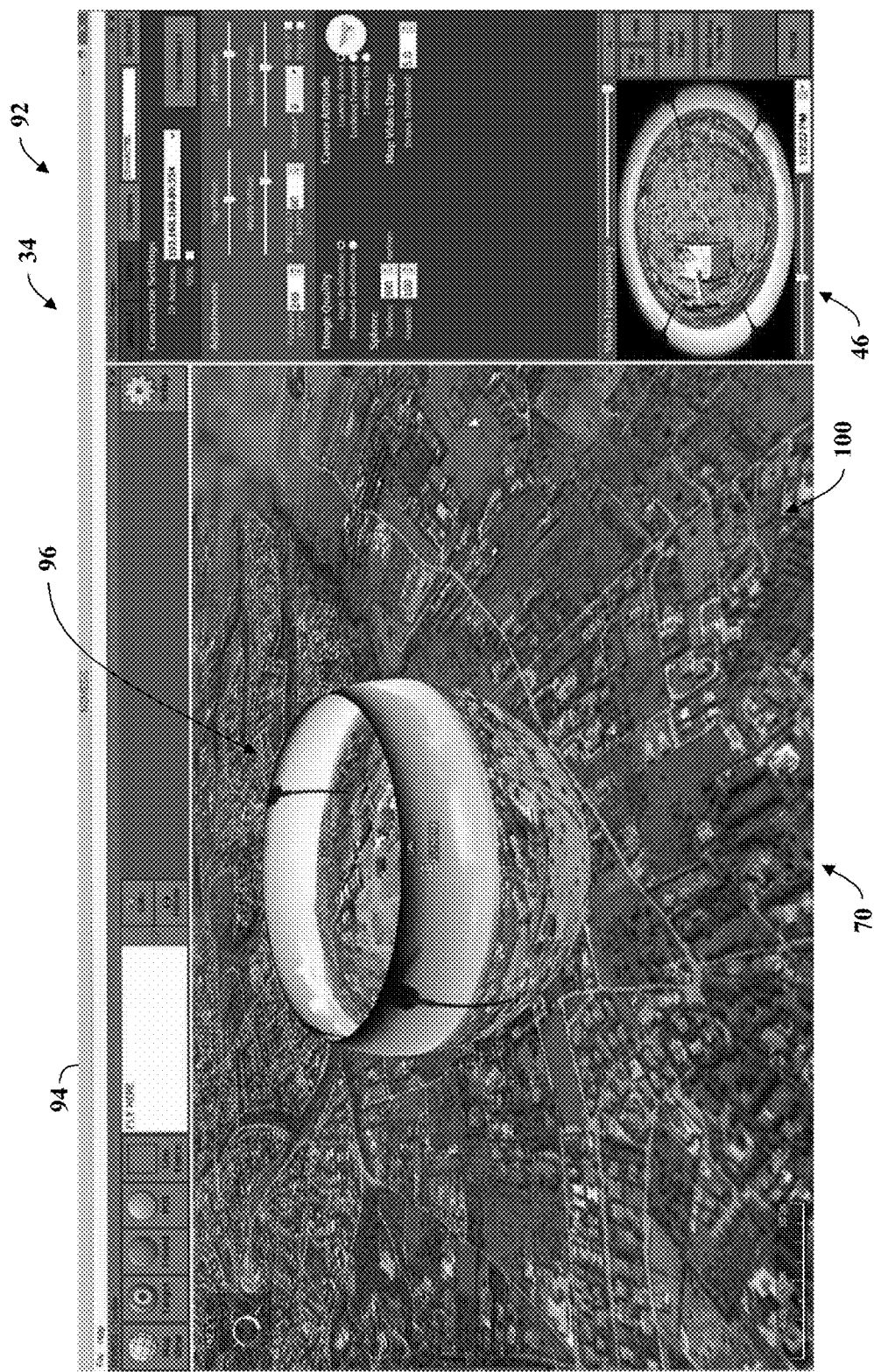
Figure 26:
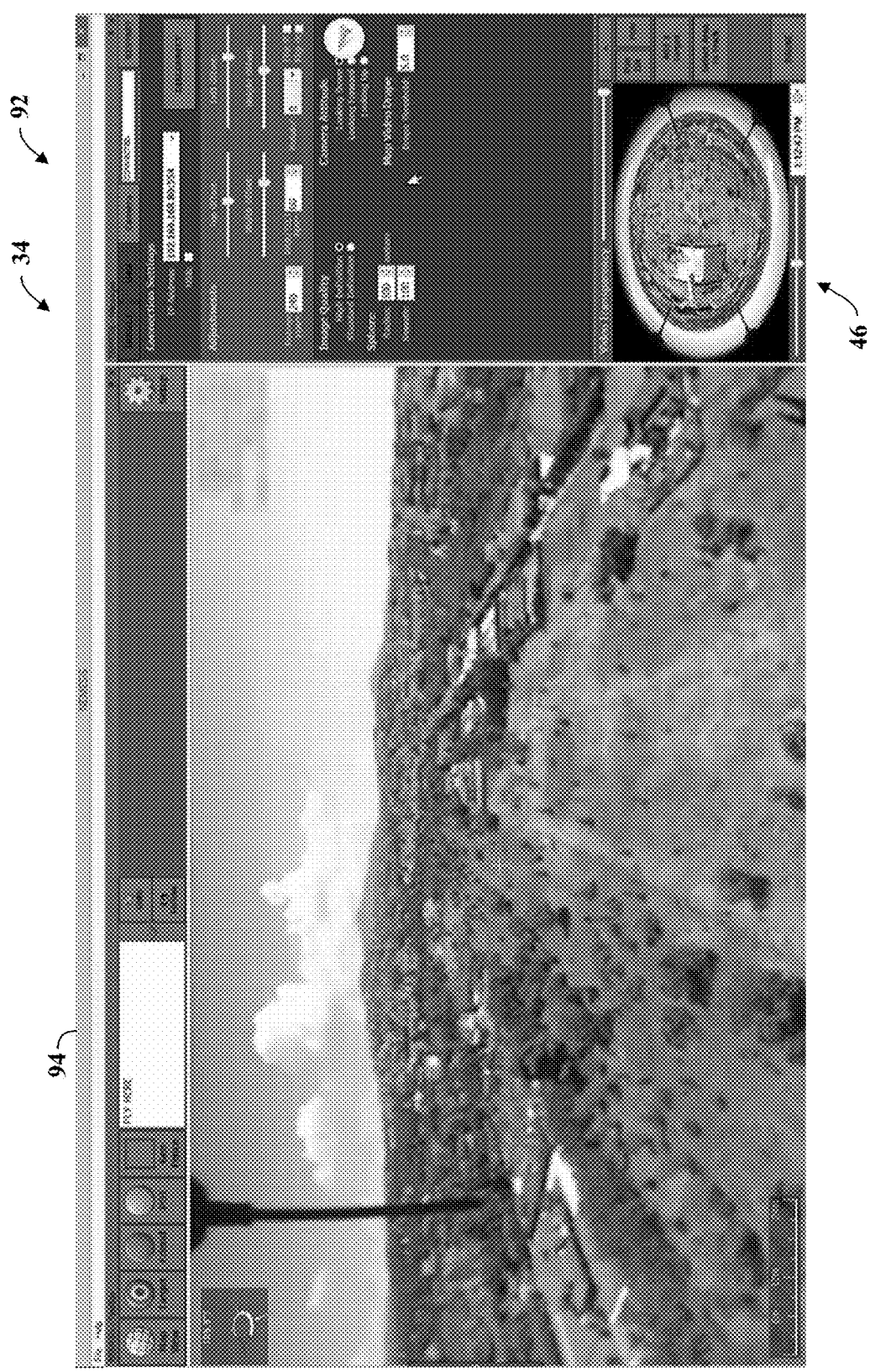
Figure 27:
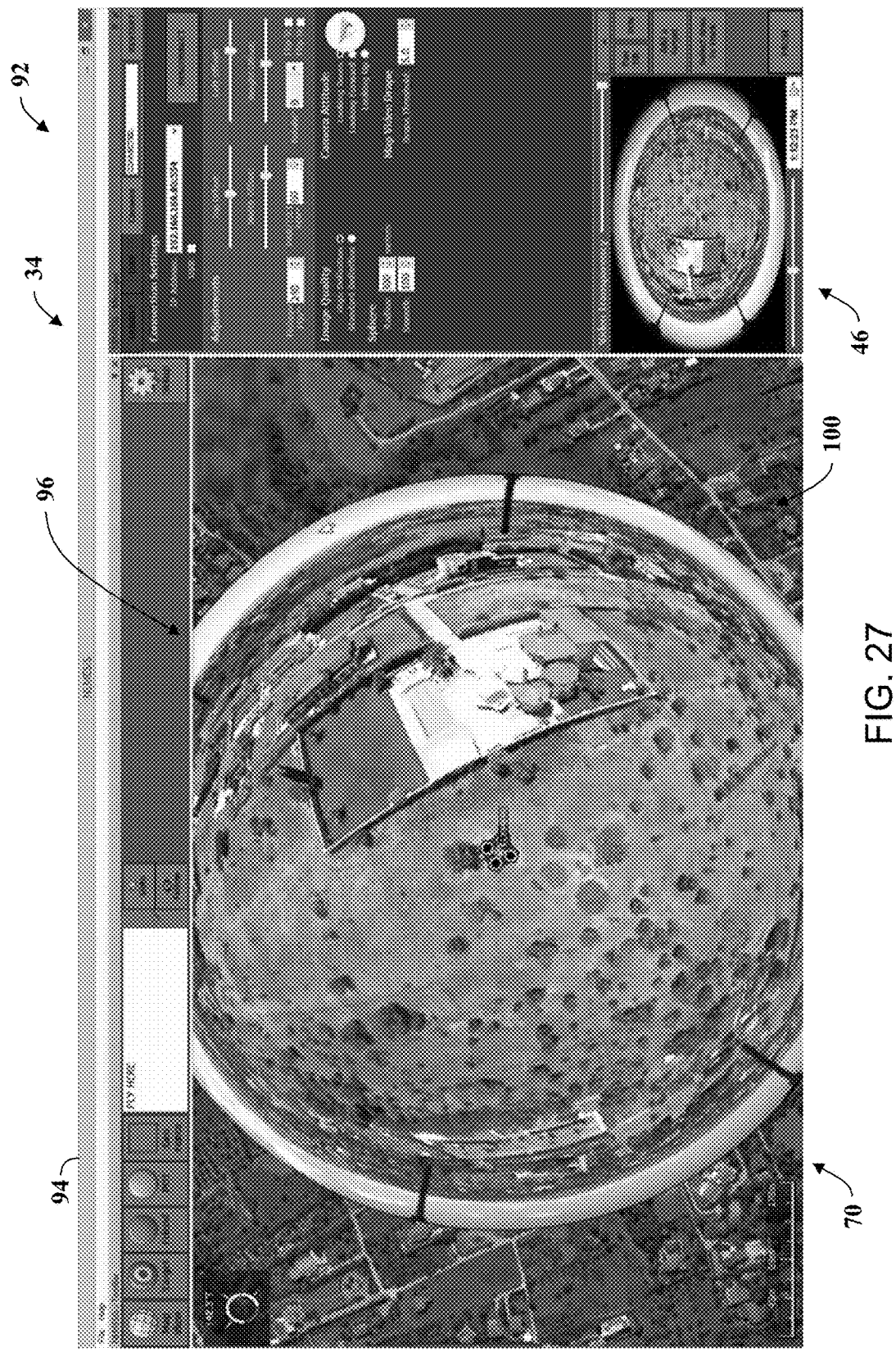

In the illustrated embodiment, the video imaging display screen 94 includes various display functionality that allows a user to select various points-of-view with respect to the 3D topographical map 70 and 3D video image object 96 to modify the user's viewpoint perspective being displayed on the video imaging display screen 94. For example, in one embodiment, the user may transmit a request via the user computing device 14 to the website hosting server 72 to generate video imaging display screen 94 including a perspective for of the 3D video image object 96 being displayed on the 3D topographical map 70, as shown in FIG. 25. The user may also modify the viewpoint perspective to display a top view of the 3D video image object 96 (shown in FIG. 27). In addition, the user may also modify the viewpoint perspective to a location inside the 3D video image object 96, as shown in FIG. 26.

Figure 20:
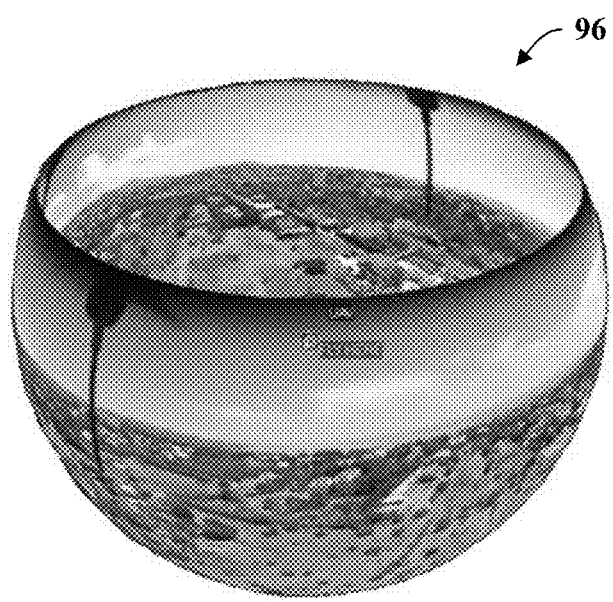
FIG. 20 is a graphic illustration of an exemplary 3D video image object generated by the system of FIG. 1, according to embodiments of the present invention.

The 3D imaging server 74 is configured to receive video image data including the 2D circular video images 46 (shown in FIG. 19) from the imaging device 18 and render a 3D video image object 96 (shown in FIG. 20) including the video image data being displayed on the 3D video image object 96. The 3D imaging server 74 generates the video imaging display screen 94 being displayed on a user computing device 14 including the 3D video image object 96 being displayed within a 3D topographical map 70.

In the illustrated embodiment, the 3D imaging server 74 is programmed to receive video image data from an imaging device 18 that includes a plurality of video frames including a sequence of 2D circular video images 46 (shown in FIG. 19). The 3D imaging server 74 determines the FOV dimensions associated with the imaging device 18 as a function of the video image data and generates a 3D spherical wireframe object 98 as a function of the FOV dimensions associated with the imaging device 18. The 3D imaging server 74 textures the 2D circular video images 46 onto the 3D spherical wireframe object 98 to generate a 3D video image object 96 (shown in FIG. 20) displaying the 2D video image data received from the imaging device 18. By texturing the 2D circular video images 46 onto the 3D spherical wireframe object 98, the 3D imaging server 74 dewarps the 2D circular video images 46 to remove the image distortions that are included in the 2D circular video images 46 to present more realistic view of objects displayed in the 2D circular video images 46. The 3D imaging server 74 then displays the 3D video image object 96 on the 3D topographical map 70 in a 3D environment 100 displayed within the video imaging display screen 94. The 3D imaging server 74 generates the a 3D environment to allow the user to navigate within the 3D environment 100 to change the user's viewpoint of images being displayed on the video imaging display screen 94. For example, the generated 3D environment 100 allows the user to change the user's viewpoint to a position within the 3D video image object 96, using a user input device such as a mouse and/or touchscreen, which allows the user to view dewarped and undistorted video images being captured by the imaging device 18.

The 3D imaging server 74 is also programmed to receive geographic location data associated with the imaging device 18 and display the 3D video image object 96 on the 3D topographical map 70 at a geographic location that is determined as a function of the received geographic location data associated with the imaging device 18. In addition, in one embodiment, the 3D imaging server 74 may be programmed to determine an orientation and direction (shown in FIG. 8) of the imaging device 18 and generate the 3D video image object 96 including an orientation and direction that matches the orientation and direction of the imaging device 18. The 3D imaging server 74 may also be programmed to assign geographic coordinates to objects appearing in the video images being received from the imaging device 18 based on the geographic location and orientation of the 3D video image object 96.

Figure 2:
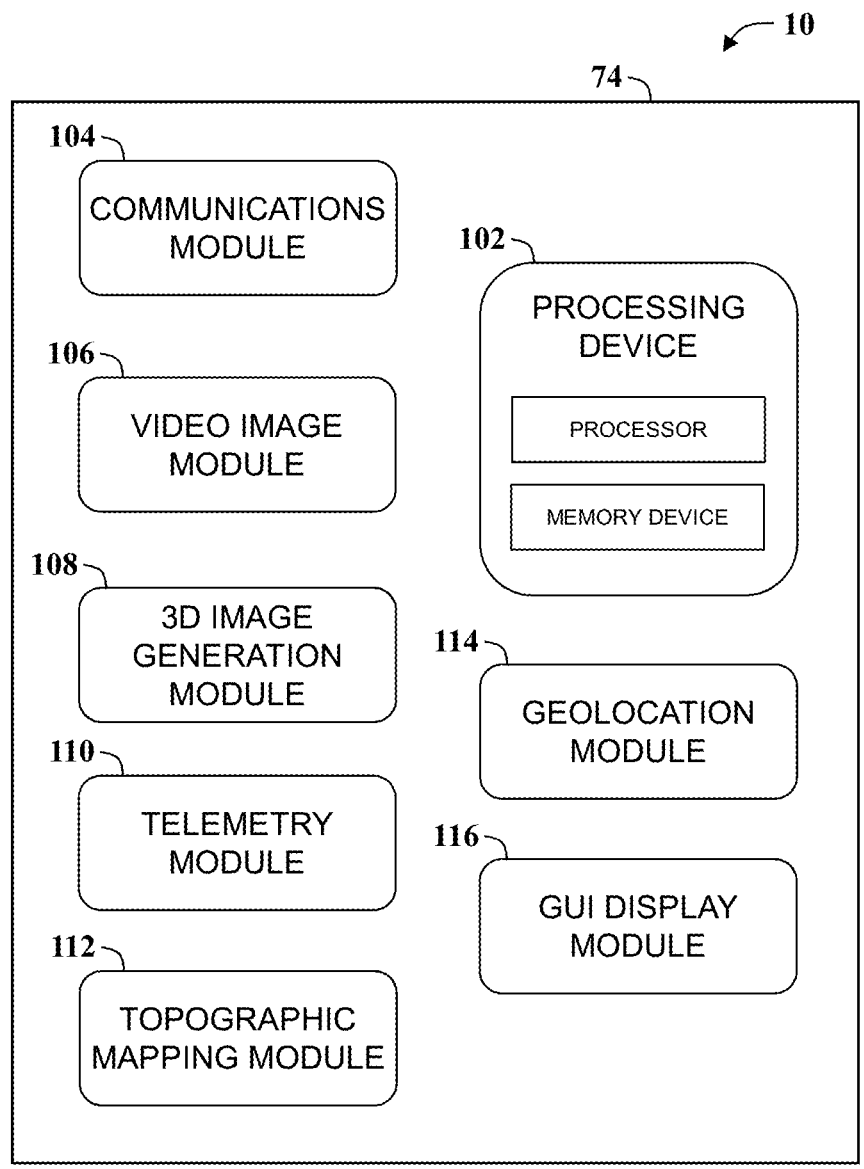
FIG. 2 is a schematic illustrating example components of a computing device that may be used with the system shown in FIG. 1, according to an embodiment of the present invention.

Referring to FIG. 2, in the illustrated embodiment, the 3D imaging server 74 includes a processing device 102 that executes various programs, and thereby controls components of the 3D imaging server 74 according to user instructions received from the user computing device 14. The processing device 102 may include memory, e.g., read only memory (ROM) and random access memory (RAM), storing processor-executable instructions and one or more processors that execute the processor-executable instructions. In embodiments where the processing device 102 includes two or more processors, the processors can operate in a parallel or distributed manner. In an example, the processing device 102 may execute a communications module 104, a video image module 106, a 3D image generation module 108, a telemetry module 110, a topographic mapping module 112, a geolocation module 114, and a graphical user interface (GUI) GUI display module 116.

The processing device 102 may also include a memory device for storing programs and information in the database 78, and retrieving information from the database 78 that is used by the processor to perform various functions described herein. The memory device may include, but is not limited to, a hard disc drive, an optical disc drive, and/or a flash memory drive. Further, the memory device may be distributed and located at multiple locations.

The communications module 104 receives and sends various data and information to and from the user computing device 14, the imaging device 18, the database server 76, and the $3^{rd}$ party mapping server 16. For example, the communications module 104 receives and sends various data and information to and from the user computing device 14 to enable the user to access and interact with the system 10. In one embodiment, the communications module 104 transmits requests for data associated with 3D topographical maps to the $3^{rd}$ party mapping server 16, receives 3D topographical map data from the $3^{rd}$ party mapping server 16, and transmits the received data to the topographic mapping module 112. In the illustrated embodiment, the communications module 104 receives a request from a user via a user computing device 14 to display video images. For example, in one embodiment, a user may submit a request to display video images by transmitting an HTML command request via the video imaging display screen 94 being displayed on a user computing device 14 and/or by launching a mobile application via a mobile computing device 22 to display the video imaging display screen 94 on the mobile computing device 22. Upon receiving the request, the communications module 104 may access the IP address data files 80 to modify the client device IP address data file 84 to include information associated with the corresponding user computing devices 14 including, but not limited to, a unique client device ID, a corresponding IP address, and information associated with the client device type. In addition, the communications module 104 may access the imaging device IP address data file 82 to determine imaging devices 18 that are connected to the server system 12, and display a list of the connected imaging devices 18 via the video imaging display screen 94 that are selectable by the user. In one embodiment, the communications module 104 may receive a selection of an imaging device 18 from the user and transmit a request for video and telemetry data to the selected imaging device 18.

In the illustrated embodiment, the communications module 104 transmits a request for telemetry data and video image data to the imaging device 18 via the communications network, and receive a multiplexed data signal from the imaging device 18 including the video image data and the telemetry data. For example, the communications module 104 may be configured to receive an RTSP video/telemetry data stream from the imaging device 18. The communications module 104 is configured to de-multiplex the RTSP video/telemetry data stream to parse the RTSP video/telemetry data stream into a telemetry data stream that is transmitted to the telemetry module 110 and a video data stream that is transmitted to the video image module 106.

The video image module 106 receives the video data stream from the communications module 104 and determines the FOV dimensions associated with the imaging device 18 based on the data and information included in the video data stream. For example, the video image module 106 receives the video data stream and determines FOV dimensions including the vertical angle of view and the horizontal angle of view. In one embodiment, the video image module 106 may access the imaging device IP address data file 82 to update the data associated with the imaging device 18 to include information associated with the FOV dimensions determined from the received video data stream.

The telemetry module 110 receives the telemetry data stream from the communications module 104 and determines the attitude, elevation, and geographic location of the imaging device 18 as a function of the information included in the telemetry data stream being received from the imaging device 18. For example, the telemetry module 110 receives the telemetry data stream including attitude and bearing data from the IMU 56 of the imaging device 18, and determines an orientation of the imaging device 18 including a pitch 60, roll 62, and yaw, and bearing direction of the imaging device 18. In addition, the telemetry module 110 determines the geographic location and elevation of the imaging device 18 based on the GPS location and elevation data included in the telemetry data stream. The telemetry module 110 generates telemetry data associated with the imaging device 18 including the attitude, location, and elevation of the imaging device 18 and transmits the telemetry data to the 3D image module, topographic mapping module 112, and the geolocation module 114. In addition, the telemetry module 110 continually updates the telemetry data associated with the imaging device 18 based on the telemetry data stream being received from the imaging device 18 to reflect changes in the attitude, location, and elevation of the imaging device 18.

The 3D image generation module 108 is configured to generate a 3D video image object 96 (shown in FIGS. 20 and 22) as a function of the telemetry data and video image data being received from the imaging device 18. In the illustrated embodiment, the 3D image generation module 108 is configured to determine the FOV dimensions associated with the imaging device 18 and generate the 3D video image object 96 as a function of the FOV dimensions associated with the imaging device 18. In one embodiment, the 3D image generation module 108 may receive the FOV dimensions associated with the imaging device 18 from the video image module 106. In another embodiment, the 3D image generation module 108 may determine the IP address associated with the imaging device 18 based on the video image data, and access the imaging device IP address data file 82 and identify the FOV dimensions associated with the imaging device IP address.

Figure 17:
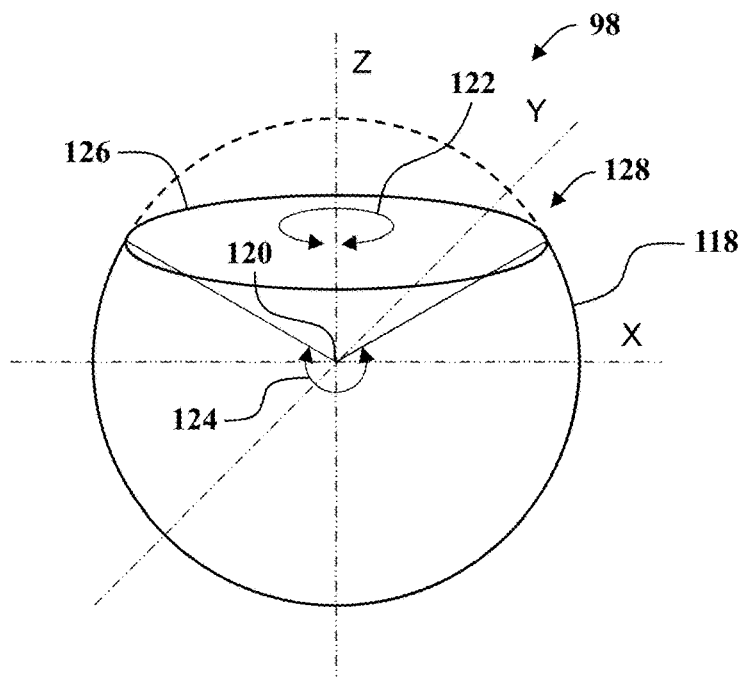
FIGS. 17-18 are graphic illustrations of exemplary 3D spherical wireframe objects generated by the system of FIG. 1, according to embodiments of the present invention.
Figure 18:
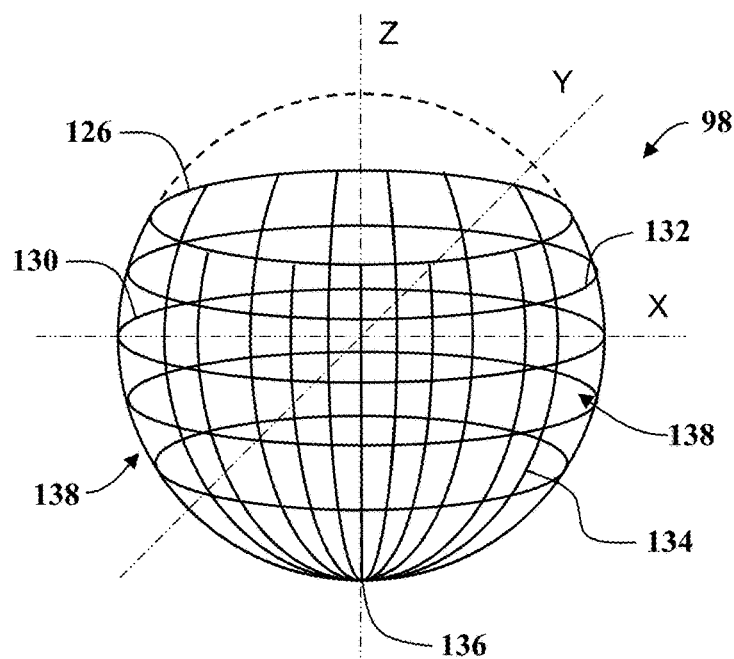

Referring to FIGS. 17-18, in the illustrated embodiment, the 3D image generation module 108 is configured to generate the 3D video image object 96 by receiving the video image data from an imaging device including 2D circular video images 46, and determine the FOV dimensions associated with the imaging device 18 as a function of the video image data. The 3D image generation module 108 generates a 3D spherical wireframe object 98 having a surface area that is determined as a function of the FOV dimensions associated with the imaging device 18. The 3D image generation module 108 maps the video image data onto the 3D spherical wireframe object 98 and renders the 3D video image object 96 including the video image data being displayed on the 3D spherical wireframe object 98.

The 3D spherical wireframe object 98 is generated within a 3-dimensional space including a coordinate system defined by a perpendicular intersecting axis including an X-axis, a Y-axis, and a Z-axis. The 3D spherical wireframe object 98 includes spherical shape defining a spherical sector 118 including a center point 120, a degree of curvature 122 measured about the Z-axis intersecting the center point 120, and a segment angle 124 measured about a plane defined by the intersection of the Z-axis and the Y-axis, and/or the Z-axis and the X-axis. The segment angle 124 is measured with respect to a base circle 126 that defines a top end 128 of the 3D spherical wireframe object 98. In one embodiment, the base circle 126 has a circumference that is less than a circumference of the great circle 130 defined at the center point 120 of the 3D spherical wireframe object 98.

In addition, the 3D image generation module 108 generates the 3D spherical wireframe object 98 including a plurality of co-axial circles 132 spaced along the Z-axis, and a plurality of arcuate segment lines 134 that intersect a bottom point 136 of the 3D spherical wireframe object 98 and each of the co-axial circles 132. In addition, the 3D spherical wireframe object 98 includes a plurality of 3D surface segments 138. Each 3D surface segment 138 includes a surface area defined between adjacent co-axial circles 132 and adjacent arcuate segment lines 134. In one embodiment, the 3D image generation module 108 maps the 2D circular video image 46 onto each of the 3D surface segments 138, and textures the 2D circular video image 46 onto the 3D spherical wireframe object 98 by stretching the 2D circular video image 46 around the 3D spherical wireframe object 98 to dewarps the 2D circular video image 46 and generate the 3D video image object 96 to display an undistorted realistic view of objects displayed in the video image data.

In the illustrated embodiment, the 3D image generation module 108 determines the horizontal angle of view 48 included in the FOV dimensions associated with the imaging device 18 and generates the 3D spherical wireframe object 98 including a degree of curvature 122 that matches the horizontal angle of view 48. In addition, the 3D image generation module 108 determines the vertical angle of view 50 included in the FOV dimensions and generates the 3D spherical wireframe object 98 including an a segment angle 124 that matches the vertical angle of view 50. In one embodiment, the 3D image generation module 108 may receive data indicating the imaging device FOV dimensions from the video image module 106 and access the 3D object data file 86 to determine the 3D object dimension data associated with the imaging device FOV dimensions. The 3D image generation module 108 may select the object record 88 having FOV dimensions matching the received imaging device FOV dimensions and determine the 3D object dimension data included in the selected object record 88. The 3D image generation module 108 then generates the 3D spherical wireframe object 98 having a spherical shape including dimensions based on the 3D object dimension data associated with the image device FOV dimensions. In one embodiment, the 3D image generation module 108 generates the 3D image generation module 108 having a predefined radius. In another embodiment, the 3D image generation module 108 allows the user to input a radius value for the 3D spherical wireframe object 98 via the video imaging display screen 94 and generates the 3D spherical wireframe object 98 having the user selected radius.

Referring to FIGS. 21-22, in one embodiment, the 3D image generation module 108 generates a 2D mapping object 140 as a function of the 2D circular video image 46 and overlays the 2D mapping object 140 onto the 2D circular video image 46 to identify a plurality of 2D image segments 142. Each 2D image segment includes a portion of the 2D circular video image 46. The 2D mapping object 140 includes a plurality of concentric circles 144 orientated about an object center point 146. The 2D mapping object 140 includes a plurality of radially spaced segment lines 148 passing through the object center point 146 and intersecting each concentric circle 144 to define the 2D image segments 142. Each 2D image segment 142 includes a surface area defined between adjacent concentric circles 144 and adjacent segment lines 148. The 2D mapping object 140 includes an outer concentric circle 150 having a circumference matching a circumference of the 2D circular video image 46.

In one embodiment, the 3D image generation module 108 textures the 2D circular video image 46 onto the 3D spherical wireframe object 98 by overlaying the 2D mapping object 140 onto the 2D circular video image 46 to define the 2D image segments 142 associated with the 2D circular video images 46. The 3D image generation module 108 then associates the object center point 146 of the 2D circular video image 46 with the bottom point 136 of the 3D spherical wireframe object 98 and associates the outer concentric circle 150 of the 2D mapping object 140 with the base circle 126 of the 3D spherical wireframe object 98, and assigns each 2D image segment 142 to a corresponding 3D surface segment 138. The 3D image generation module 108 textures each assigned 2D image segment 142 onto the corresponding 3D surface segment 138 to map the video image data onto the 3D spherical wireframe object 98 and renders the 3D video image object 96. In one embodiment, one or more of the 2D image segments 142 may include a surface area that is different than a surface area of the corresponding assigned 3D surface segment 138. If the surface area of the 2D image segment is less than the surface area of the assigned 3D surface segment 138, the 3D image generation module 108 modifies the 2D image segment to increase the surface area and stretch the 2D image segment to match the surface area of the assigned 3D surface segment 138. If the surface area of the 2D image segment is greater than the surface area of the assigned 3D surface segment 138, the 3D image generation module 108 modifies the 2D image segment to decrease the surface area and shrink the 2D image segment to match the surface area of the assigned 3D surface segment 138.

The topographic mapping module 112 receives the geographic location and elevation data of the imaging device 18 from the telemetry module 110 and transmits a request the $3^{rd}$ party mapping server 16 for 3D topographical map data associated with the geographic location and elevation data of the imaging device 18. Upon receiving the 3D topographical map data from the $3^{rd}$ party mapping server 16, the topographic mapping module 112 generates data and information associated with the 3D topographical map 70 based on the 3D topographical map data received from the $3^{rd}$ party mapping server 16, and transmits the data associated with the 3D topographical map 70 to the 3D image generation module 108.

In the illustrated embodiment, the 3D image generation module 108 receives the data and information associated with the 3D topographical map 70 from the topographic mapping module 112 and the telemetry data associated with the imaging device 18 from the telemetry module 110 and renders the 3D environment 100 including the 3D video image object 96 being displayed on the 3D topographical map 70 at a geographic location determined as a function of the received geographic location data associated with the imaging device 18. In addition, the 3D image generation module 108 orientates the 3D video image object 96 to include an attitude and bearing direction matching the attitude and bearing direction of the imaging device 18. For example, the 3D image generation module 108 renders the 3D video image object 96 to include the pitch 60, roll 62, and yaw 64, and bearing direction of the imaging device 18. The 3D image generation module 108 may also receive updated telemetry data associated with the imaging device 18 from the telemetry module 110 and modify the attitude and bearing direction of 3D video image object 96 to match the changes in the attitude and bearing direction of the imaging device 18.

Figure 23:
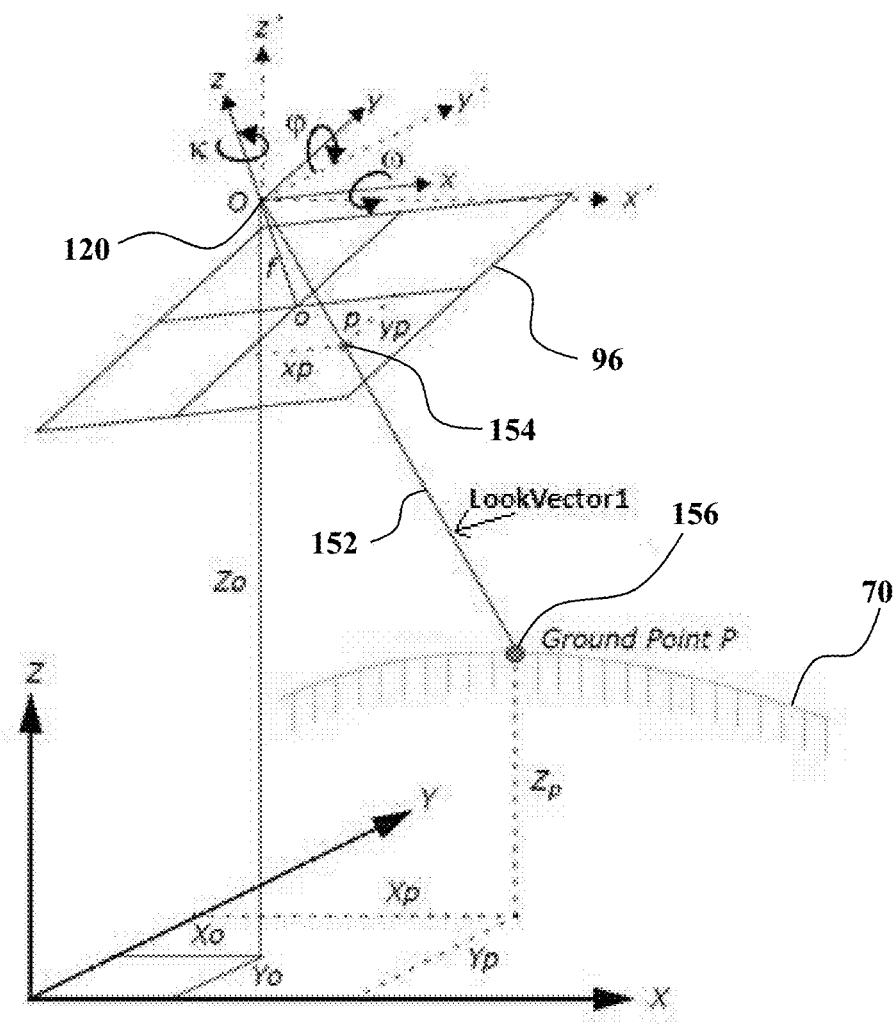
FIG. 23 is a graphic image illustrating a process for generating a georeferenced 3D video image object by the system of FIG. 1, according to embodiments of the present invention.
Figure 24:
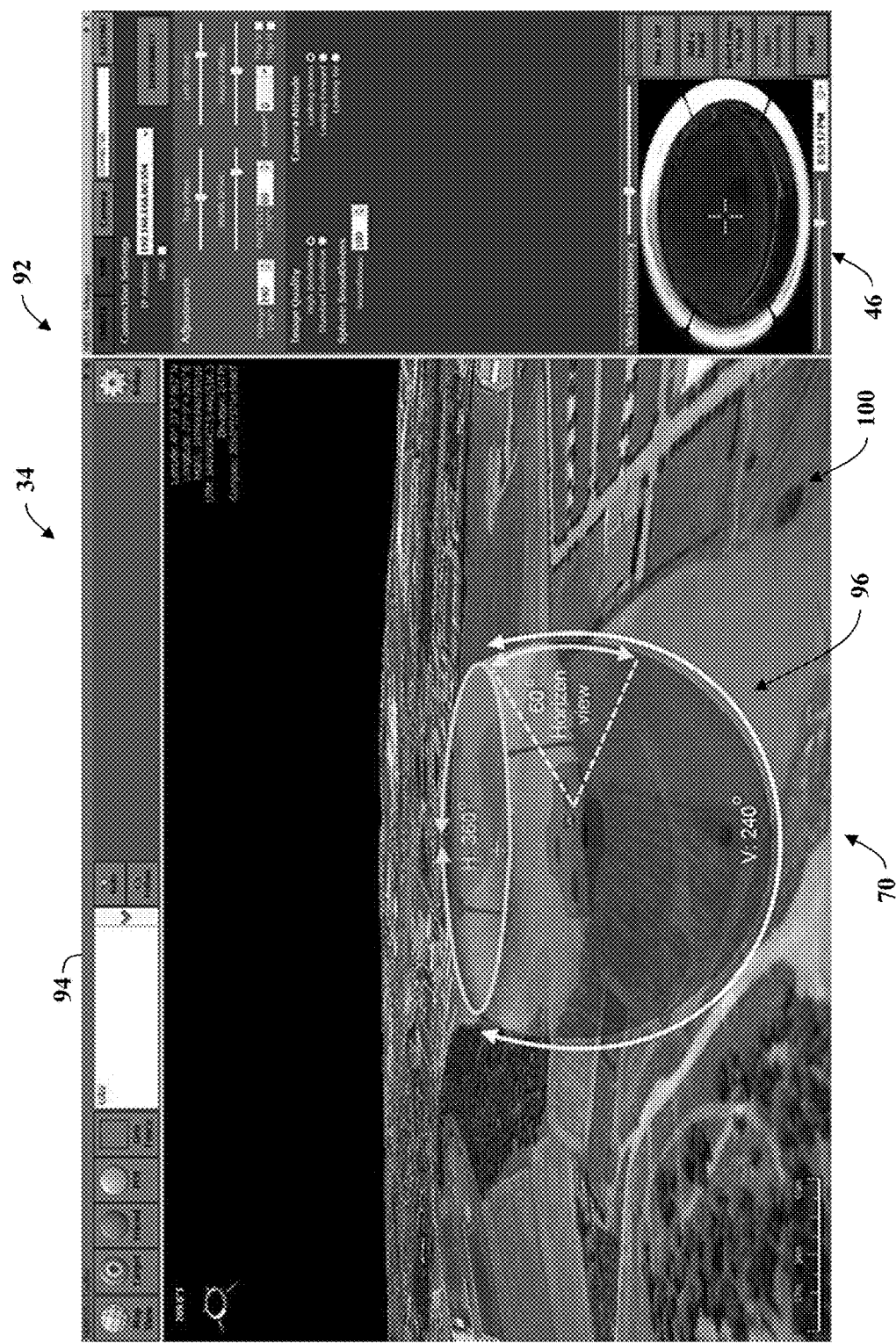
FIGS. 24-27 are illustrations of exemplary screenshots generated by the system of FIG. 1, according to an embodiment of the present invention.

Referring to FIG. 23, in the illustrated embodiment, the geolocation module 114 is configured to generate geographic coordinates associated with various objects included in the video image data being displayed on the 3D video image object 96. The geolocation module 114 utilizes the information and data being generated by the 3D image generation module 108 for the 3D video image object 96 including the video image data being displayed on the 3D video image object 96, the attitude and orientation of the 3D video image object 96, and the geographic location and elevation of the 3D video image object 96 with respect to the 3D topographical map 70 to assign geographic coordinates to the objects being displayed on the 3D video image object 96 to produce a geo-registered 3D video image. The geographic coordinates assigned to the objects in the video image data indicate the physical geographic coordinates of the objects being displayed within the video image data.

In one embodiment, the geolocation module 114 identifies the center point 120 of the 3D video image object 96 and generates a vector ray 152 that extends radially outwardly from the center point 120 towards the surface of the 3D video image object 96. The geolocation module 114 determines an image point 154 on the surface of 3D video image object 96 at an intersection of the vector ray 152 and the surface of the 3D video image object 96. The geolocation module 114 also determines an object point 156 located along the 3D topographical map 70 at an intersection of the vector ray 152 and the 3D topographical map 70. The geolocation module 114 determines geographic coordinates of the object point 156 on the 3D topographical map 70 and assigns the geographic coordinates of the object point 156 to the image point 154 on the 3D video image object 96. In one embodiment, the geolocation module 114 may generate geographic image data associated with one or more image pixels being displayed on the 3D video image object 96 and store the geographic image data in the graphic image data file 90. The geographic image data may include, but is not limited to, a unique image point identifier, geographic coordinate data assigned to the image pixel, and an elevation assigned to the image pixel.

The GUI display module 116 receives data and information from the 3D image generation module 108, the topographic mapping module 112, and the geolocation module 114 and generates computer code instructions and object data for rendering the 3D environment 100 within the video imaging display screen 94 including the 3D video image object 96 and the 3D topographical map 70. The video imaging display screen 94 allows the user to navigate throughout the 3D environment 100 to view the 3D video image object 96 from various perspectives (shown in FIGS. 24-27), including entering the 3D video image object 96 to view the video image data in an undistorted view. In addition, video imaging display screen 94 displays the geographic coordinate data assigned to the image pixels as the user accesses an image object being displayed on the 3D video image object using a user input device such as, for example, hovering a cursor over an image area, or touching an image area via a touchscreen.

In addition, the GUI display module 116 may access the client IP address data file 84 to determine the type of user computing device 14 being used to display the video imaging display screen 94 and generate the code instructions and object data based on the type of user computing device 14. The GUI display module 116 may then transmit the computer code instructions and object data to the website hosting server 72 for use in generating a displaying a web page 92 on the user computing device 14, and/or transmit the computer code instructions and object data to the user computing device 14 for use in generating the 3D environment 100 on the display device of the user computing device 14.

Figure 4:
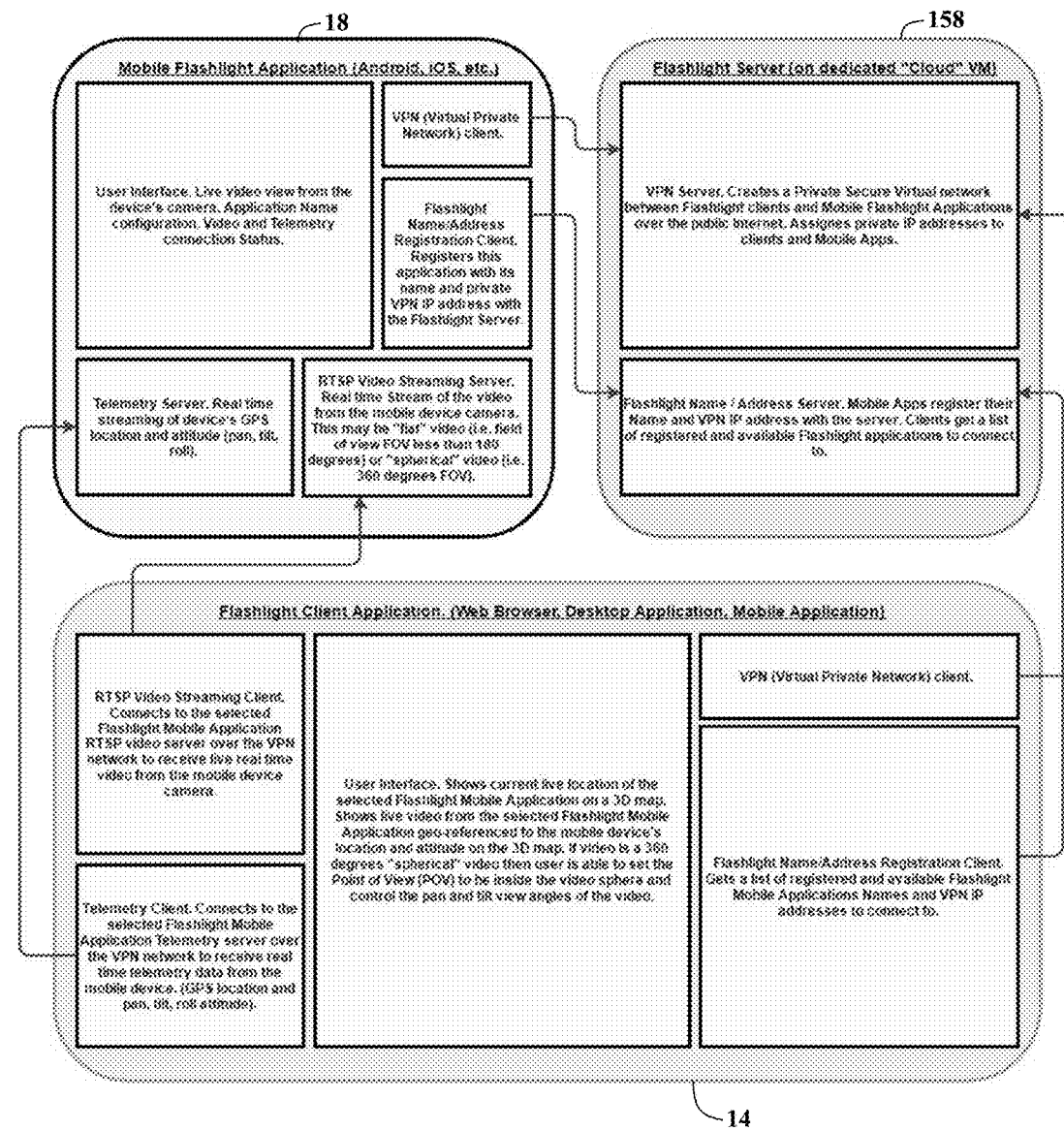
FIG. 4 is another schematic illustrating example components of the system shown in FIG. 1, according to an embodiment of the present invention.

In one embodiment, the 3D imaging server 74 may be implemented on a user computing device 14. For example, as shown in FIG. 4, the system 10 may include the imaging device 18, a VPN server 158, and a user computing device 14 that includes a software program installed on the user computing device 14 that causes the processor of the user computing device 14 to function as the 3D imaging server 74. The system 10 may include an imaging device 18 that includes a high FOV (Field of View. i.e. 360×240 degrees) fisheye lens attached to a mobile computing device 22 such as, for example, a smart phone camera in order to produce a live video with a high FOV and a fisheye (circular) frame. The mobile computing device 22 executes a Mobile Flashlight Application program that causes the processor of the mobile computing device 22 to encode the fisheye video as a compressed h.264 video stream. The Mobile Flashlight Application obtains telemetry data from the device (GPS and attitude) and multiplexes this data (adds it as a data track) into the encoded h.264 video stream. The final video/telemetry stream is fed into an RTSP video server. The user computing device 14 executes a Flashlight Client application that implements an RTSP Video client and connects this client to the Flashlight Mobile Application RTSP Server to start receiving the RTSP h.264 video/telemetry stream.

The received video/telemetry stream is demultiplexed and the video frames and telemetry data are processed as follow: the Flashlight Client Application displays a 3D map of the world (satellite, street view, etc.) including the terrain altitude taken into account and allows the user to pan, tilt and rotate the map view. The Flashlight Client Application parses the telemetry data and draws a 3D "hemisphere" using the smart phone camera FOV angles (i.e. a 360×240 degrees hemisphere and the smart phone GPS and attitude information to position this hemisphere at the correct location and attitude on the 3D map). At this point the hemisphere is drawn as a "wire frame" mesh of vertices and triangles. The location and attitude of this hemisphere is updated realtime from the telemetry data being received on the h.264 video/telemetry stream by the RTSP client. The Flashlight Client Application decodes each fisheye video frame from the video stream and uses each frame's image as a "texture" onto the 3D hemisphere. In addition, the Flashlight Client Application creates a 3D shape (in this case a hemisphere) then covers the surface of this shape with a particular graphic (texture) (i.e. an image, a picture, a color, etc.). For example, the Flashlight Client Application covers the 3D shape with the real time live video frames coming from the Mobile Flashlight Application over the RTSP video stream.

The fisheye image is "dewarped" from the 2D fisheye distorted circle image into an undistorted "3D" sphere image. The "dewarping" process includes the geometric process of projecting a 2D fisheye circle image into a 3D hemisphere of the corresponding FOV angles. At this point the Flashlight Client Application is showing a 3D sphere that displays the live video from the camera located at the smart phones location and attitude. The user is now able to change his/her POV (point of View) and locate himself/herself "inside" the 3D video sphere and look around the sphere as an undistorted 360 degrees video. In one embodiment, all computer processing for viewing the spherical video (i.e. the Flashlight Client application: Mobile, Desktop, Web based) occurs on the user's device.

Telemetry: In one embodiment, the telemetry data (GPS location+phone pan, tilt, roll attitude) is multiplexed with the video stream. This means that the RTSP H.264 video streams contains a second metadata track that includes the telemetry data. On the client side the video stream is de-multiplexed and the second metadata stream is extracted. The telemetry data is parsed by the clients and use to display the location of the phone on the map with its orientation and also to display the 3D projection of the live video stream both flat video (FOV less than 180) or spherical video (FOV greater than 180) at the correct "projected" location and FOV from the location of the phone's camera on the 3D map. All this information is streamed and updated real time so that the user of the client applications can "follow" the Flashlight Mobile App it is connected to and see the changes in location, attitude and video on the map.

Display: In one embodiment, once the phone's video stream makes it to the client application the client application extracts each video frame as it arrives real time. If the video is flat (less than 180 degrees field of view) then the video is shown on the map as a flat rectangular frame. The location and "attitude" of this frame on the 3D map is calculated using the telemetry data from the phone. Knowing the phone location and the camera FOV angles the flat rectangular frame can be drawn at the appropriate location on the map. This location/attitude changes real time with the location/attitude of the phone. The user may also change its point of view around the map and locate itself at the phone location to have the POV of the video from the location of the phone itself.

If the video is spherical (field of view greater than 180 (Fisheye frame). Normally the field of view is 360 horizontally by some value greater than 180 and less than 360 vertically, for example 360H×240V) the processing is more complicated. The basic process is to create a 3D "hemisphere" centered at the location of the phone and taking into consideration the phones attitude and camera FOV angles. This hemisphere is a "wire frame" and its surface consists of many vertices/triangles. The higher the number of vertices and triangles the smoother the appearance of the sphere on the display (the "wire frame" is not shown on the display). The hemisphere location/attitude is, once again, updated real time from the phone Telemetry data.

Once the hemisphere wire frame is calculated then the fisheye video frames that are being received real time from the phone's camera are "textured/draped" over the hemisphere wire frame so that the user sees the live video as a 3D "sphere" on the map. The fisheye video frames from the camera cannot be applied directly as a texture to the hemisphere but need to be "de-warped/stretched" over the hemisphere wire frame. All this occurs real time on the client device (PC, mobile). As with the flat view the client user may change the point of view from "outside" the sphere (i.e. viewing the map, phone location and video sphere from above) to inside the sphere as the point of view of the camera, allowing the user to "look around" the sphere without the distortion of the original fisheye video frame.

This process improves the functioning of known computer imaging systems by avoiding commonly used techniques including: 1.) using multiple cameras with smaller FOV and non fisheye frames and then "stitching" all this images together to produce a high FOV image; or 2.) adding preprocessing on the camera side to avoid the highly distorted fisheye frame.

Figure 9:
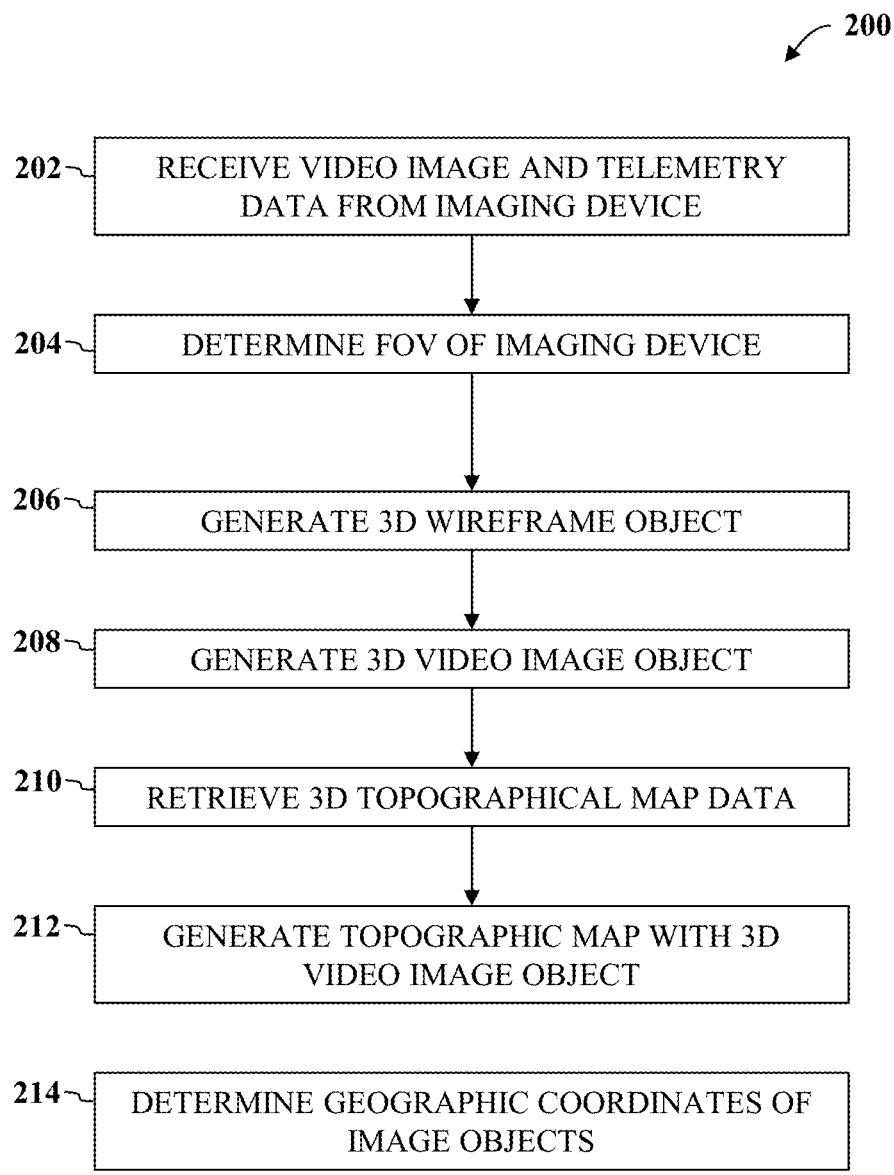
FIGS. 9-12 are flowcharts of methods that may be used with the system shown in FIG. 1, according to embodiments of the present invention.
Figure 10:
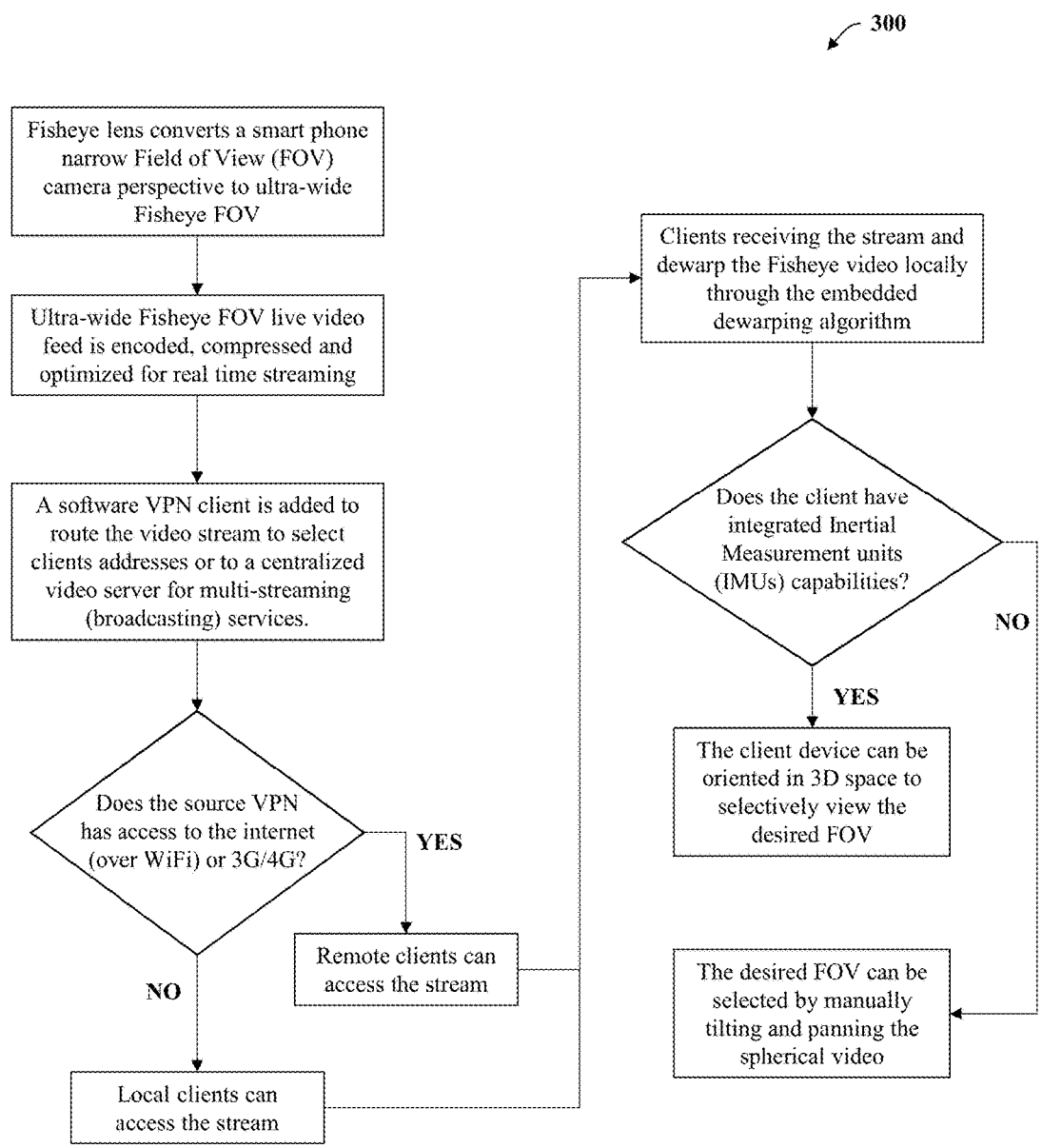
Figure 11:
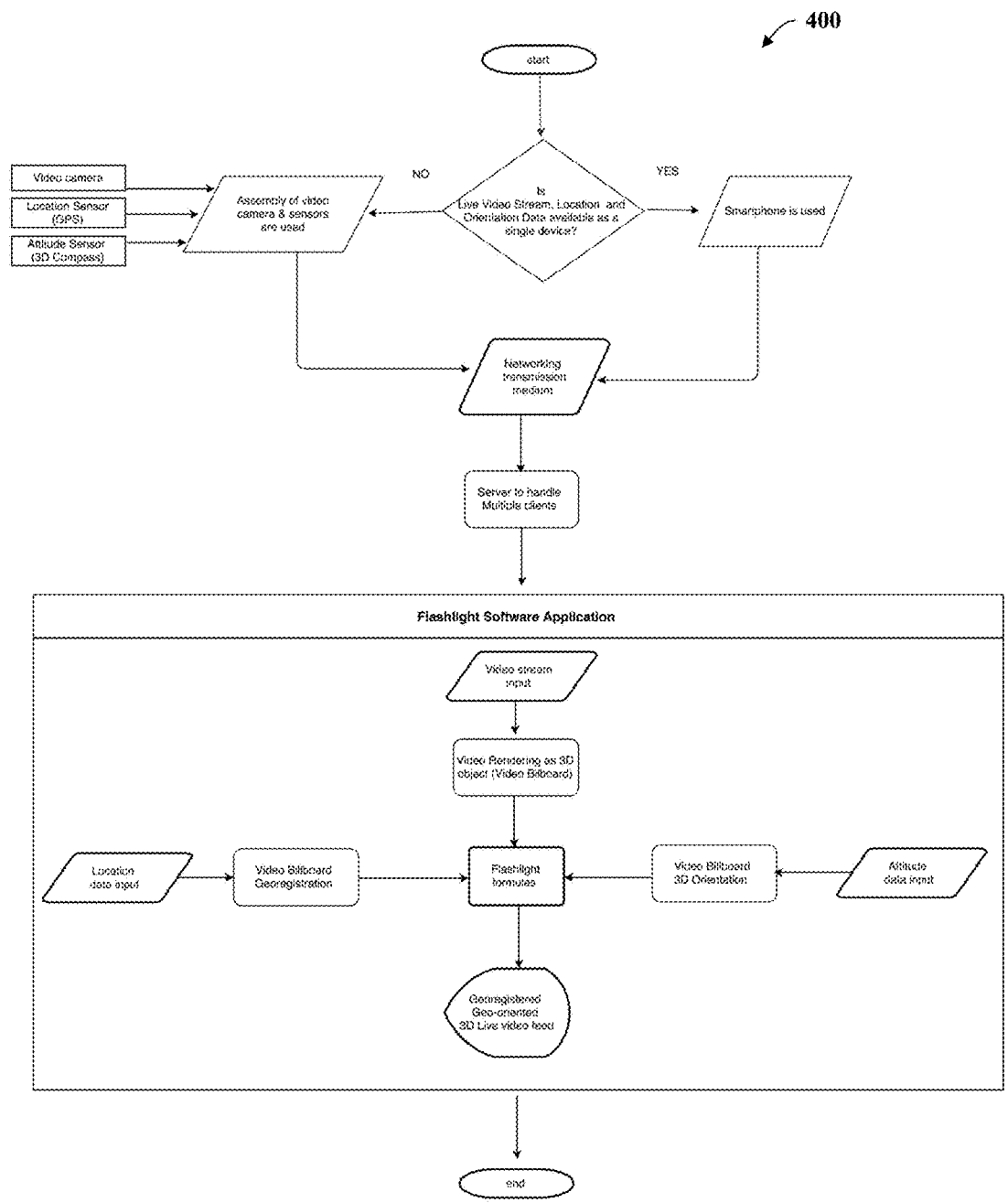

FIGS. 9-11 are flowcharts of methods 200, 300, and 400 that may be used with the system 10 for generating 3D video image objects for use in displaying circular 2D video images. The methods include a plurality of steps. Each method step may be performed independently of, or in combination with, other method steps. Portions of the methods may be performed by any one of, or any combination of, the components of the system 10. FIGS. 24-28 are exemplary graphical displays that may be displayed by the system 10.

Referring to FIG. 9, in the illustrated embodiment, in method step 202, the processor of the 3D imaging server 74 receives video image data from an imaging device 18 that includes 2D circular video images 46 (shown in FIG. 19). In one embodiment, the processors receives an RTSP video/telemetry data stream from the imaging device 18 and demultiplexes the RTSP video/telemetry data stream to parse the RTSP video/telemetry data stream into a telemetry data stream and a video data stream. The telemetry data stream includes information associated with the attitude, bearing direction, geographic location, elevation, and orientation of the imaging device 18. The video data stream includes information associated with video imaged being captured by the imaging device 18.

In method step 204, the 3D imaging server 74 determines the FOV dimensions of the imaging device 18. For example, in one embodiment, the 3D imaging server 74 may analyze the information included in the video data stream to determine the FOV dimensions associated with the imaging device 18. The 3D imaging server 74 may also determine the IP address associated with video image data being received from the imaging device 18, access the image device IP address data file 82 (shown in FIG. 1) and determine the FOV dimensions associated with the IP address of the imaging device 18.

In method step 206, the 3D imaging server 74 generates a 3D spherical wireframe object 98 as a function of the FOV dimensions associated with the imaging device 18. For example, the 3D imaging server 74 may generate the 3D spherical object including a spherical segment angle determined as a function of the FOV dimensions associated with the imaging device. In one embodiment, the 3D imaging server 74 may determine the horizontal angle of view 48 and the vertical angle of view 50 (shown in FIG. 6) included in the FOV dimensions associated with the imaging device 18. The 3D imaging server 74 may then generate the 3D spherical wireframe object 98 including a degree of curvature 122 matching the horizontal angle of view 48 and a segment angle 124 matching the vertical angle of view 50.

In method step 208, the 3D imaging server 74 generates a 3D video image object 96 by mapping the video image data onto the 3D spherical wireframe object and rendering render the 3D video image object including the video image data being displayed on the 3D spherical wireframe object. For example, in one embodiment, textures the 2D circular video image 46 onto the 3D spherical wireframe object 98 by stretching the 2D circular video image 46 around the 3D spherical wireframe object 98 to dewarp the 2D circular video image 46 and generate the 3D video image object 96 to display an undistorted realistic view of objects displayed in the video image data. Referring to FIG. 21, in one embodiment, the 3D imaging server 74 may also be programmed to define a plurality of 2D image segments 142 associated with the 2D circular video images 46. The 3D imaging server 74 may also generate the 3D spherical wireframe object including a plurality of 3D surface segments 138. The 3D imaging server 74 then assign a 2D image segment to each 3D surface segment, and modify image data associated with each 2D image segment to display each 2D image segment in a corresponding assigned 3D surface segment. In one embodiment, at least one 2D image segment includes a surface area that is different than a surface area of the corresponding assigned 3D surface segment.

In method step 210, the 3D imaging server 74 determines a geographic location of the imaging device 18 based on the received telemetry data stream and retrieves topographical map data as a function of the geographic location of the imaging device 18. For example, in one embodiment, the 3D imaging server 74 may transmit the geographic location of the imaging device 18 to a $3^{rd}$ party mapping server 16 including a request for topographical mapping data associated with the location of the imaging device 18.

Figure 28:
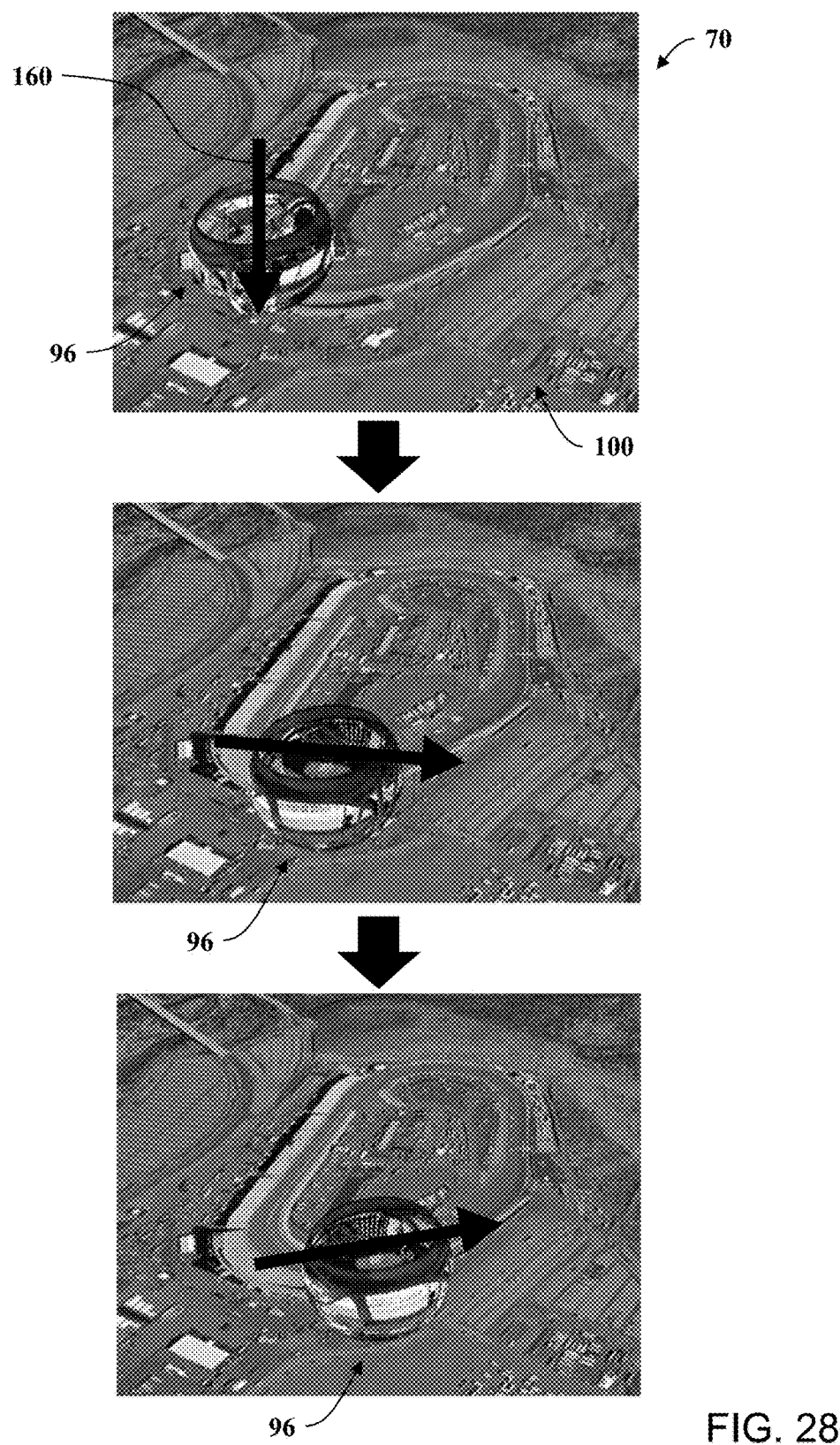
FIG. 28 is a sequence of exemplary screenshots generated by the system of FIG. 1, according to an embodiment of the present invention.

In method step 212, the 3D imaging server 74 generates a 3D environment 100 including the 3D video image object 96 being displayed with a topographical map 70. For example, as shown in FIG. 22, in one embodiment, the 3D imaging server 74 determines the attitude and location of the imaging device 18 based on the telemetry data stream, and orientates the 3D video image object 96 to include an attitude and bearing direction matching the attitude and bearing direction of the imaging device 18. In addition, as shown in FIG. 28, the 3D imaging server 74 is configured to receive updated telemetry data associated with the imaging device 18 modify the attitude and bearing direction 160 of 3D video image object 96 to match the changes in the attitude and bearing direction of the imaging device 18.

In one embodiment, the 3D imaging server 74 may be programmed to receive geographic location data associated with the imaging device, generate and display a 3D topographic map on the display device, and display the 3D video image object on the 3D topographic map at a location determined as a function of the received geographic location data associated with the imaging device. In addition, the 3D imaging server 74 may be programmed to determine a bearing direction of the imaging device, generate the 3D video image object including an object bearing direction, and render the 3D video image object on the 3D topographical map such that the object bearing direction matches the bearing direction of the imaging device.

In method step 214, the 3D imaging server 74 determines geographic coordinates associated with objects being displayed on the 3D video image object to display the geographic coordinates of the objects in response to user requests. Referring to FIG. 23, in one embodiment, the 3D imaging server 74 is programmed to generate a vector ray 152 extending radially outwardly from a center point 120 of the 3D video image object 96, and determine an image point 154 on the 3D video image object at an intersection of the vector ray and the 3D video image object. The 3D imaging server 74 also determines an object point 156 along the 3D topographic map at an intersection of the vector ray and the 3D topographic map, determines geographic coordinates of the object point, and assigns the geographic coordinates of the object point to the image point.

Figure 12:
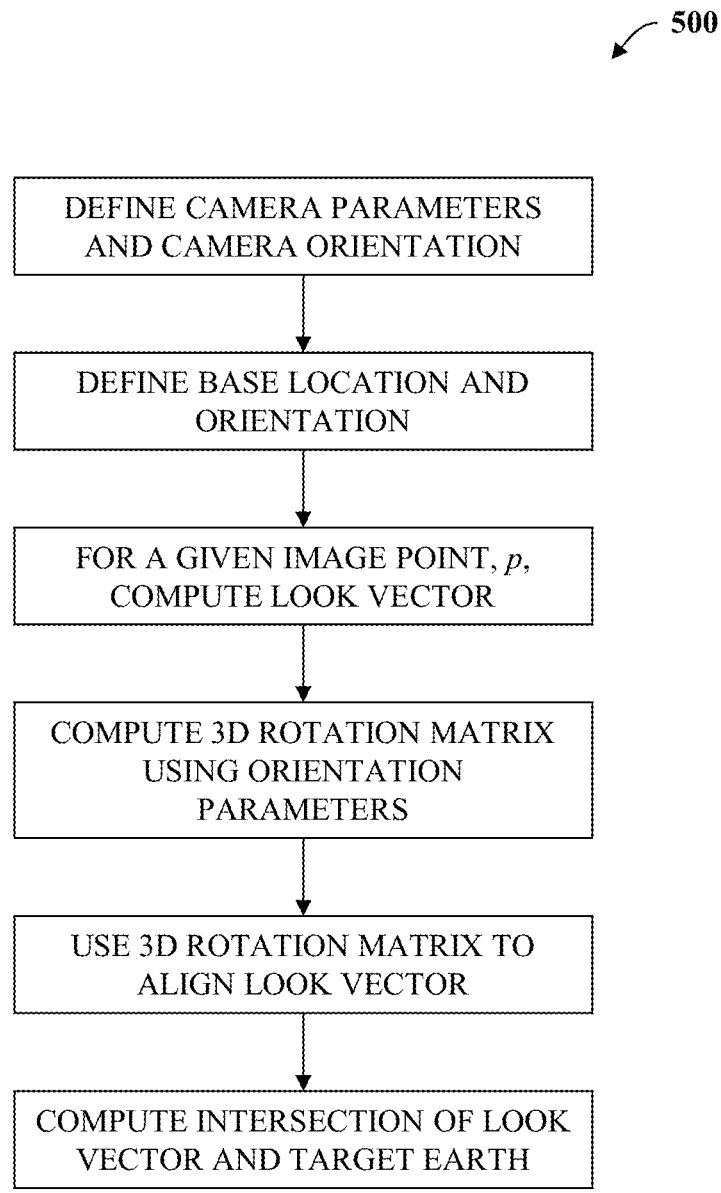

Referring to FIGS. 12 and 23, in one embodiment, the 3D imaging server 74 may implement method 500 to geo-locate video image pixels being displayed on the 3D video image object 96 using a projection based on ray tracing. In one embodiment, the 3D imaging server 74 may receive video image data from a camera mounted on an unmanned aerial vehicle (UAV) that is used for mounting and orientation of the camera. The video image data may include a ground or projection surface which is imaged by camera. The camera model may be of type a simple Pan-Tilt-Zoom (PTZ) Camera or a Fish-Eye camera or a Spherical camera. While the projection surface and mount (Base) remains the same, the projection type is governed by the type of camera used. Each of the camera type can undergo pan and tilt. For example, a PTZ camera (PTZCamera.cs) uses a planar image plane. A Fish-eye camera (FishEyeCamera.cs) uses a cylindrical image plane, while a spherical camera (SphericalCamera.cs) uses a spherical image plane. A basic camera (Camera.cs) may be defined in terms of its focal length, horizontal and vertical FOV and image size. An internal parameter of detector size is used by the 3D imaging server 74 for computation, but its value is derived from FOV and image size. A mount or Base (Base.cs) is defined in terms of its location and orientation (Pan, Tilt and Yaw). A ground surface is defined in terms of its distance from camera and is always a plane surface that is being imaged.

The 3D imaging server 74 uses ray tracing to geo-locate video image pixels being displayed on the 3D video image object 96. The 3D imaging server 74 computes both ground coordinates and above ground bearing vectors that corresponds to any image point. First, the 3D imaging server 74 computes 3D look vector 152 that joins the image point 154 and the camera optical centre. This is known as camera internal orientation that is computed through, the following function call:

Point3d lookVector=ptzCamera.ComputeInternalOrientation(cameraPoint).

A projection is carried out within class BaseModeler.cs. Multiple, functions in this class are used for different camera types. Next, a 3D rotation matrix is computed that takes into account rotation of mount (Base roll, pitch and yaw), as well as camera orientation (Pan and tilt). This 3D rotation matrix is multiplied with look vector to orient the look vector in real earth using:

R=ComputeRotationMatrix(yaw, pitch, roll, 0);//0: mode of rotation computation for internal use Point3d lookVector1=MatMult(lookVector, R);

lookVector1 is the ray that emerges from image location and hit the earth after passing through optical center. This vector is oriented in real earth as per orientation of UAV and camera. Next, the 3D imaging server 74 computes travel along the lookvector1 until the lookvector1 intersects the target object or earth, using:

Location groundLocation=Util.MoveToGround(uay.Location, groundPoint);

Since, distance of UAV or camera from earth is obtained from the imaging device telemetry data, the 3D imaging server 74 computes the exact distance needed to travel along the lookvector1 line to hit the ground.

Referring to FIGS. 10 and 11 in one embodiment, a user computing client device may be programmed to implement methods 300 and 400 to function as the 3D imaging server 74 to generate the 3D video image object 96. In method 300, the imaging device 18 includes a Fisheye lens attached to a mobile computing device such as, for example, a smart phone, and converts a smart phone narrow Field of View (FOV) camera perspective to an ultra-wide Fisheye FOV. The ultra-wide Fisheye FOV live video feed is encoded, compressed and optimized for real time streaming by the imaging device 18. The Fisheye video stream is transferred over wireless media (3G or WiFi) to client devices. The client devices can be other smartphones, desktop or laptop PCs, IPTVs, etc. A software VPN client is added to route the video stream to select clients addresses or to a centralized video server for multi-streaming (broadcasting) services. The VPN client determines whether the source VPN has access to the internet (over WiFi) or 3G/4G? If the source VPN, such as the imaging device 18, has access to the internet, remote clients may access the video stream. If the source VPN does not have internet access, only local clients may access the video stream. The client device receives the video stream and dewarps the Fisheye video locally through the embedded dewarping algorithm. If the client has integrated Inertial Measurement units (IMUs) capabilities, the client device can be oriented in 3D space to selectively view the desired FOV. If the client device does not have an integrated IMU, the desired FOV can be selected by manually tilting and panning the spherical video.

In one embodiment, a flashlight software application, executed by a processor of a user computing device, "georeferences" real time video streams from Smartphones, Tablets or other mobile devices and cameras. The flashlight application is used to enhance the situational awareness of the viewer by creating a 3 dimensional digital perspective of the video stream with regards to its absolute location and orientation with the surrounding environment.

The Flashlight application, combines a) real time or recorded video streams with b) data from position (GPS) and orientation sensors (Inertial Measurement Units) and uses them to create a georeferenced video stream on top of a digital mapping layer. The resulted video stream is now projected on the map with the same location and orientation as the camera used to stream video. If the streaming camera is moving i.e. mobile, the resulted video stream is updating the projection on the map accordingly to match the camera location and orientation.

The Flashlight method of viewing live or pre-recorded video streams differs from legacy video viewing applications as it adds the element of "perspective" to the resulted footage. The viewer has a better sense of where the video stream is coming from, where the camera sensor is pointing and as a direct outcome, objects that appear on the video stream are now referenced with regards to their real environment (georeferenced).

Prior art systems such as the "Google street view" application attempts to create a 3D perspective by generating still image panoramas by stitching together imagery frames and placing the user in the middle of these scenes. In addition, prior art video viewing systems only offer a 2-dimensional visualization without reference to the surrounding environment.

The Flashlight application differs from known applications by dynamically updating the scene with real time information from live video footage. The processing power required to update the 3D scene with real time footage is one of the challenges that the Flashlight application overcomes. Flashlight runs in the background highly efficient algorithms that allow the real time updating of the 3D scene and the 3-Dimensional video projection dynamically (at run time). This feature is unique to the Flashlight application. Also, unique is the 3D perspective that this method generates to georeferenced the video on top of the digital terrain.

The Flashlight application improves the experience video streams are visualized. Flashlight offers a new video visualization experience by creating a 3-Dimentional "georeferenced" perspective of the video stream. The information conveyed to the end user is enhanced with geolocation data and thus improves the spatial awareness of the viewer.

Flashlight application adds the element of "geo-location" and "geo-orientation" to the viewing experience thus substantially improving the user perspective as if the viewer was in the actual scene. One advantage of is that the objects, events and activity appearing on the video stream are now referenced with regards to the real environment. As a direct outcome, the viewer can interact much better with the received information and take decisions faster. The user of the Flashlight application can also obtain geographic coordinates information for every object appearing in the video stream. This is a significant added valued with regards to existing video viewing applications. Real time video stream from mobile devices and off-the-self cameras enriched with location/orientation data is fused to remote clients over the internet (or other type of networks) and synthesized to a 3-Dimentional georeferenced projection.

In one embodiment, the Flashlight application is comprised of the following two elements: A. the georeferenced video producing device (this is called the Flashlight video sensor); and B. the video viewing software application running at client PCs (this is called the Flashlight Application). The georeferenced video producing device (Flashlight video sensor) is a video camera that has been combined with a location/orientation sensor. Such a sensor is an GPS/Inertial Measurement Unit (IMU) that enriches the video frames with location/orientation information of the video camera. The resulted stream contains both video frames and location/orientation metadata. The enriched video stream can be fused directly to PCs running the Flashlight application or transmitted over wired/wireless networks to remote clients running the Flashlight Application. The Flashlight video sensor can be either mobile or fixed. There are two major categories of the Flashlight video sensors. 1. Cameras that are already connected to the required GPS/IMU sensors. Such cameras are the smartphone, tablet, etc., cameras that include all the required elements in a unified device (video camera, GPS, IMU, network modem). These devices can be used out of the box with the Flashlight application. 2. Standalone cameras that do not carry the required sensors. A typical example are the Security cameras. This category of cameras requires the addition of the GPS/IMU sensor to become Flashlight compatible. A typical structure of such a system is a video camera connected to a cellular modem. The modem is also connected with the GPS/IMU sensor. The video stream combined with the position information is transmitted over the cellular network to remote client PCs running the Flashlight application.

The Flashlight software application is the heart of the system. It receives the enriched video stream from both categories of sensors as described above and by running advanced geolocation algorithms in the background it synthesizes a unified 3-Dimentional video stream that is georeferenced with regards to the surrounding environment. An additional added value of the Flashlight application is that it can assign a geographic coordinate pair (lat/lon) to every video pixel (pixel/coordinates correlation). As a result, the objects appearing on the video footage are now precisely georeferenced and their geographic coordinates can be also viewed and utilized for operational applications.

The Flashlight application can be utilized as both an online and offline service. The online service is better suited for mobile devices where users can share their current video camera footage combined with geolocation data with every other user in the world that is currently online and have access to internet. A web interface simplifies access to these data so users can see other users georeferenced video by visiting the Flashlight web page.

The Flashlight application can be used at closed, private or VPN networks as well without a restriction. This infrastructure is better suited for private organizations that wish to keep the flashlight traffic within their organization limits. Such an example is the use of Flashlight for Law Enforcement vehicles and personnel.

In one embodiment, the Flashlight application can not only project video as a 3-Dimentional, georeferenced footage. It can also produce a "curved" projected video surface to better match the optical characteristics of the camera being used. A Wide Field Of View (180 degrees) camera for example can be viewed a projected semi-cylindrical surface projection that better resembles the human vision Field of View. Another characteristic of Flashlight is the ability to stitch together and in real time the video streams from multiple camera sensors that have been placed in an array. The resulted projected video surface is accordingly shaped to match the combined video streams. Successful experiments have been conducted that demonstrate the generation of a homogenous "video sphere" resembled from multiple individual 90×90 degrees FOV cameras placed in an array that covers the sectors of sphere. This real time "video sphere" is the next generation of Flashlight application that will be used to monitor areas and facilities by eliminating the blind regions. The video 3-Dimentional perspective that the Flashlight application generates may be used with optical payloads mounted on Drones to enhance the perspective of the drone operator. For example, real time video correlation on top of the digital terrain. By using 3-dimensional video layer correlated with mapping imagery layer of the digital terrain, every video pixel is assigned a pair of geographic coordinates thus objects appearing within the video stream are now "georeferenced".

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A computer system for displaying spherical video images, comprising:
   a user computing device including a display device and a processor coupled to the display device, the processor programmed to:
   receive video image data from an imaging device, the video image data including 2-dimensional (2D) circular video images;
   determine field-of-view (FOV) dimensions associated with the imaging device as a function of the video image data;
   generate a 3-dimensional (3D) spherical wireframe object on the display device, the 3D spherical wireframe object having a surface area determined as a function of the FOV dimensions associated with the imaging device;
   map the video image data onto the 3D spherical wireframe object;
   render a 3D video image object on the display device including the video image data being displayed on the 3D spherical wireframe object;
   receive geographic location data associated with the imaging device;
   generate and display a 3D topographic map on the display device;
   display the 3D video image object on the 3D topographic map at a location determined as a function of the received geographic location data associated with the imaging device;
   generate a vector ray extending radially outwardly from a center point of the 3D video image object;
   determine an image point on the 3D video image object at an intersection of the vector ray and the 3D video image object;
   determine an object point along the 3D topographic map at an intersection of the vector ray and the 3D topographic map;
   determine geographic coordinates of the object point; and
   assign the geographic coordinates of the object point to the image point.

2. The computer system of claim 1, wherein the processor is programmed to:
   generate the 3D spherical object including a spherical segment angle determined as a function of the FOV dimensions associated with the imaging device.

3. The computer system of claim 1, wherein the processor is programmed to:
   generate the 3D spherical wireframe object including a plurality of 3D surface segments;
   define a plurality of 2D image segments associated with the 2D circular images;
   assign a 2D image segment to each 3D surface segment; and
   modify image data associated with each 2D image segment to display each 2D image segment in a corresponding assigned 3D surface segment.

4. The computer system of claim 3, wherein at least one 2D image segment includes a surface area that is different than a surface area of the corresponding assigned 3D surface segment.

5. A computer system of claim 1, wherein for displaying spherical video images, comprising:
   a user computing device including a display device and a processor coupled to the display device, the processor is programmed to:
   receive video image data from an imaging device, the video image data including 2-dimensional (2D) circular video images;
   determine field-of-view (FOV) dimensions associated with the imaging device as a function of the video image data;
   generate a 3-dimensional (3D) spherical wireframe object on the display device, the 3D spherical wireframe object having a surface area determined as a function of the FOV dimensions associated with the imaging device;
   map the video image data onto the 3D spherical wireframe object;
   render a 3D video image object on the display device including the video image data being displayed on the 3D spherical wireframe object;
   receive geographic location data associated with the imaging device;
   generate and display a 3D topographic map on the display device;
   determine a bearing direction of the imaging device;
   generate the 3D video image object including an object bearing direction; and
   render the 3D video image object on the 3D topographical map such that the object bearing direction matches the bearing direction of the imaging device.

6. A system for displaying spherical video images, comprising:
   an imaging device configured to capture 2D circular video images and generate and transmit video image data including the 2D circular video images, the imaging device including a global positioning system (GPS) device configured to determine a geographic location of the imaging device and transmit geographic location data including information indicating the geographic location of the imaging device; and
   a user computing device including a display device and a processor coupled to the display device, the processor programmed to:
   receive the video image data from the imaging device and determine FOV dimensions associated with the imaging device as a function of the video image data;
   generate a 3D spherical wireframe object on the display device, the 3D spherical wireframe object having a surface area determined as a function of the FOV dimensions associated with the imaging device;
   map the video image data onto the 3D spherical wireframe object;
   render a 3D video image object on the display device including the video image data being displayed on the 3D spherical wireframe object;
   receive the geographic location data from the imaging device;
   generate and display a 3D topographic map on the display device;

display the 3D video image object on the 3D topographic map at a location determined as a function of the received geographic location data associated with the imaging device;
generate a vector ray extending radially outwardly from a center point of the 3D video image object;
determine an image area on the 3D video image object at an intersection of the vector ray and the 3D video image object;
determine an object point along the 3D topographic map at an intersection of the vector ray and the 3D topographic map;
determine geographic coordinates of the object point; and
assign the geographic coordinates of the object point to the image area.

7. The system of claim 6, wherein the processor is programmed to:
generate the 3D spherical object including a spherical segment angle determined as a function of the FOV dimensions associated with the imaging device.

8. The system of claim 6, wherein the processor is programmed to:
generate the 3D spherical wireframe object including a plurality of 3D surface segments;
define a plurality of 2D image segments associated with the 2D circular video images;
assign a 2D image segment to each 3D surface segment; and
modify image data associated with each 2D image segment to display each 2D image segment in a corresponding assigned 3D surface segment.

9. The system of claim 8, wherein at least one 2D image segment includes a surface area that is different than a surface area of the corresponding assigned 3D surface segment.

10. A system of claim 6, wherein for displaying spherical video images, comprising:
an imaging device configured to capture 2D circular video images and generate and transmit video image data including the 2D circular video images, the imaging device including a global positioning system (GPS) device configured to determine a geographic location of the imaging device and transmit geographic location data including information indicating the geographic location of the imaging device; and
a user computing device including a display device and a processor coupled to the display device, the processor is programmed to:
receive the video image data from the imaging device and determine FOV dimensions associated with the imaging device as a function of the video image data;
generate a 3D spherical wireframe object on the display device, the 3D spherical wireframe object having a surface area determined as a function of the FOV dimensions associated with the imaging device;
map the video image data onto the 3D spherical wireframe object;
render a 3D video image object on the display device including the video image data being displayed on the 3D spherical wireframe object;
receive the geographic location data from the imaging device;
generate and display a 3D topographic map on the display device;
determine a bearing direction of the imaging device;
generate the 3D video image object including an object bearing direction; and
render the 3D video image object on the 3D topographical map such that the object bearing direction matches the bearing direction of the imaging device.

11. One or more non-transitory computer-readable storage media, having computer-executable instructions embodied thereon, wherein when executed by at least one processor, the computer-executable instructions cause the at least one processor to:
receive video image data from an imaging device, the video image data including 2-dimensional (2D) circular video images;
determine field-of-view (FOV) dimensions associated with the imaging device as a function of the video image data;
generate a 3-dimensional (3D) spherical wireframe object on the display device, the 3D spherical wireframe object having a surface area determined as a function of the FOV dimensions associated with the imaging device;
map the video image data onto the 3D spherical wireframe object;
render a 3D video image object on a display device including the video image data being displayed on the 3D spherical wireframe object;
receive geographic location data associated with the imaging device;
generate and display a 3D topographic map on the display device;
display the 3D video image object on the 3D topographic map at a location determined as a function of the received geographic location data associated with the imaging device;
generate a vector ray extending radially outwardly from a center point of the 3D video image object;
determine an image point on the 3D video image object at an intersection of the vector ray and the 3D video image object;
determine an object point along the 3D topographic map at an intersection of the vector ray and the 3D topographic map;
determine geographic coordinates of the object point; and
assign the geographic coordinates of the object point to the image point.

12. One or more non-transitory computer-readable storage media in accordance with claim 11, wherein the computer-executable instructions cause the at least one processor to:
generate the 3D spherical object including a spherical segment angle determined as a function of the FOV dimensions associated with the imaging device.

13. One or more non-transitory computer-readable storage media in accordance with claim 11, wherein the computer-executable instructions cause the at least one processor to:
generate the 3D spherical wireframe object including a plurality of 3D surface segments;
define a plurality of 2D image segments associated with the 2D circular video images;
assign a 2D image segment to each 3D surface segment; and
modify image data associated with each 2D image segment to display each 2D image segment in a corresponding assigned 3D surface segment.

14. One or more non-transitory computer-readable storage media in accordance with claim 13, wherein at least one 2D image segment includes a surface area that is different than a surface area of the corresponding assigned 3D surface segment.

\* \* \* \* \*

UNITED STATES PATENT AND TRADEMARK OFFICE
CERTIFICATE OF CORRECTION

| | | |
|---|---|---|
| PATENT NO. | : 10,186,075 B2 | Page 1 of 1 |
| APPLICATION NO. | : 15/826483 | |
| DATED | : January 22, 2019 | |
| INVENTOR(S) | : Evangelos Foutzitzis et al. | |

It is certified that error appears in the above-identified patent and that said Letters Patent is hereby corrected as shown below:

In the Drawings

In diamond on left side of the page of FIG. 10: Please delete "Does the source VPN has access" and insert: -- Does the source VPN have access --.

In top right box of FIG. 10: Please delete "Clients receiving the stream and dewarp the Fisheye video locally" and insert: -- Clients receive the stream and dewarp the Fisheye video locally --.

In FIG. 14: Please delete "86..216.254" and insert: -- 86.216.254 --.

In the Claims

Column 28, Line 8: Please delete "of claim 1, wherein" after "A computer system".

Column 29, Line 36: Please delete "of claim 6, wherein" after "A system".

Signed and Sealed this
Twenty-third Day of April, 2019

Andrei Iancu
*Director of the United States Patent and Trademark Office*